United States Patent
Gallo et al.

[19]

[11] Patent Number: 6,095,449
[45] Date of Patent: Aug. 1, 2000

[54] DEVICE AND METHOD TO CONTROL YARN TENSION AND YARN FEEDER

[75] Inventors: Mario Gallo; Giovanni Toso, both of Mongrando, Italy

[73] Assignee: IRO AB, Ulricehamn, Sweden

[21] Appl. No.: 09/043,285

[22] PCT Filed: Sep. 16, 1996

[86] PCT No.: PCT/EP96/04054

§ 371 Date: Aug. 6, 1998

§ 102(e) Date: Aug. 6, 1998

[87] PCT Pub. No.: WO97/11016

PCT Pub. Date: Mar. 27, 1997

[30] Foreign Application Priority Data

Sep. 20, 1995 [IT] Italy .................................. VC95A0006

[51] Int. Cl.[7] .......................... B65H 51/20; D03D 47/36; G01L 1/25
[52] U.S. Cl. .................................... 242/365.4; 73/862.69; 139/452; 242/150 M; 242/419.1
[58] Field of Search .......................... 242/150 M, 147 M, 242/419.1, 419.3, 365.4; 139/194, 450, 452; 73/862.69, 159, 862.61, 828, 779

[56] References Cited

U.S. PATENT DOCUMENTS

| | | |
|---|---|---|
| 2,661,913 | 12/1953 | Heizer et al. . |
| 4,880,175 | 11/1989 | Yamauchi et al. ............. 242/150 M X |
| 5,238,202 | 8/1993 | Sheehan et al. .................... 242/150 M |
| 5,329,822 | 7/1994 | Hartel et al. . |
| 5,398,732 | 3/1995 | Zenoni et al. .................... 242/419.3 X |
| 5,546,994 | 8/1996 | Sarfati ................................. 139/194 X |
| 5,566,574 | 10/1996 | Tiziano . |
| 5,684,255 | 11/1997 | De Jager ............................. 139/194 X |
| 5,738,295 | 4/1998 | Flamm et al. ....................... 242/419.1 |

FOREIGN PATENT DOCUMENTS

| | | |
|---|---|---|
| 0 459 322 A1 | 12/1991 | European Pat. Off. . |
| 0 467 059 A1 | 1/1992 | European Pat. Off. . |
| 0 536 088 A1 | 4/1993 | European Pat. Off. . |
| 0 634 509 A1 | 1/1995 | European Pat. Off. . |
| 0 652 312 A1 | 5/1995 | European Pat. Off. . |
| 25 53 859 | 11/1976 | Germany . |
| 25 35 209 | 6/1977 | Germany . |
| 782 015 | 8/1957 | United Kingdom . |
| 810 482 | 3/1959 | United Kingdom . |

*Primary Examiner*—Michael R. Mansen
*Attorney, Agent, or Firm*—Flynn, Thiel, Boutell & Tanis, P.C.

[57] ABSTRACT

A device for controlling the tension of a yarn includes a gauge measuring tension of the yarn and optionally a brake driven by the tension gauge to vary braking of the yarn. The gauge comprises electromagnetic control means having a moveable control element subject to a force dependent on the tension of the yarn, and a control circuit. The latter circuit supplies the electromagnetic control means with a current so that the moveable control element remains virtually still in a given position, during variations of the yarn tension. This current is indicative of the tension of the yarn and is measured to obtain a measure of the yarn tension. The device can be associated with a yarn feeder having a drum and moveable eyelet coaxial with the drum.

28 Claims, 17 Drawing Sheets

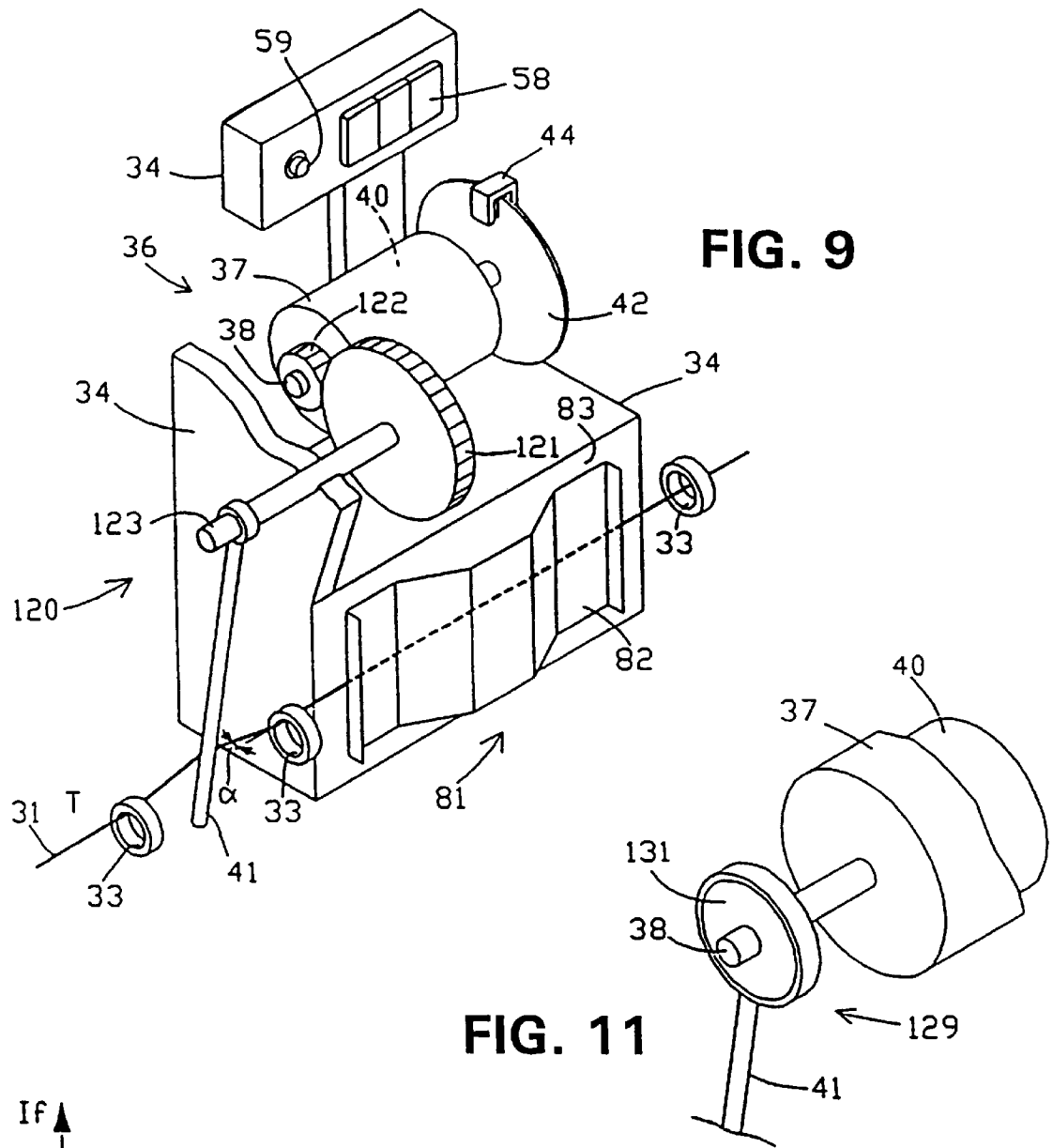
FIG. 9
FIG. 11
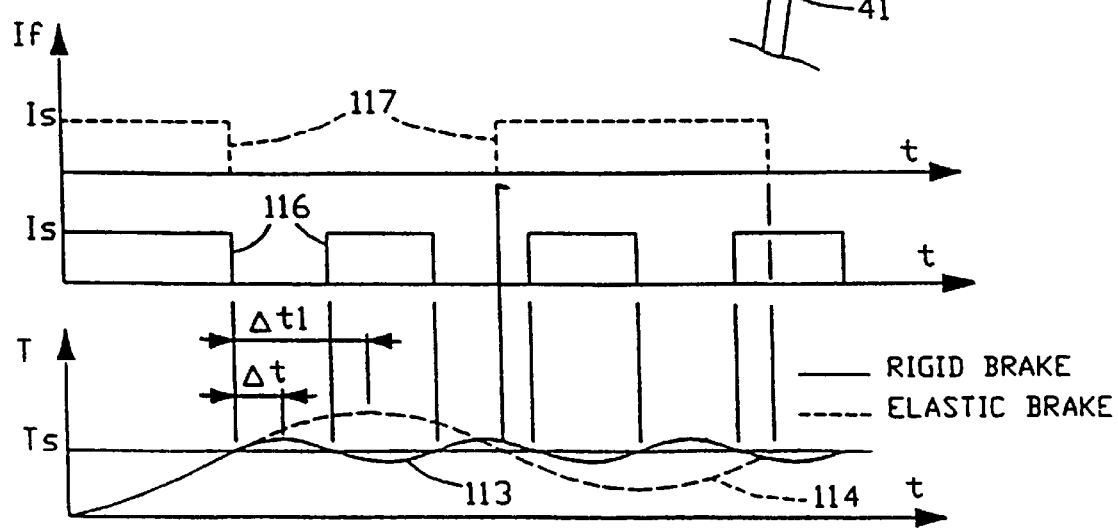
FIG. 8

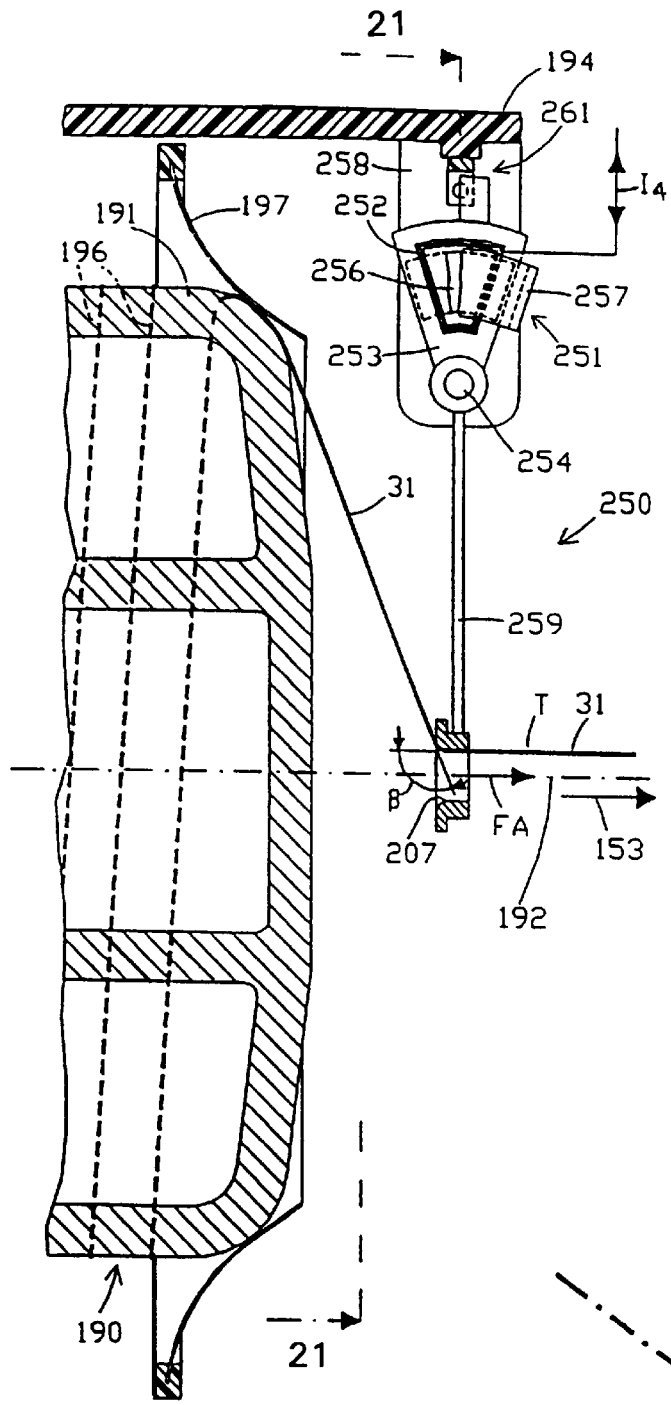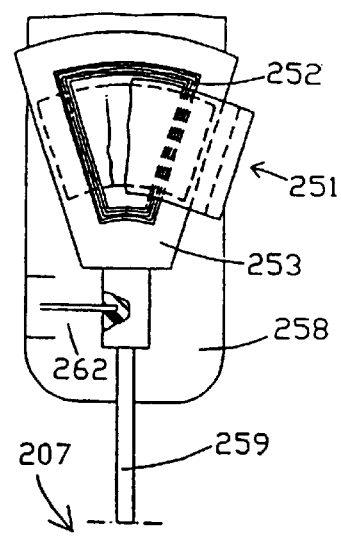
FIG. 22
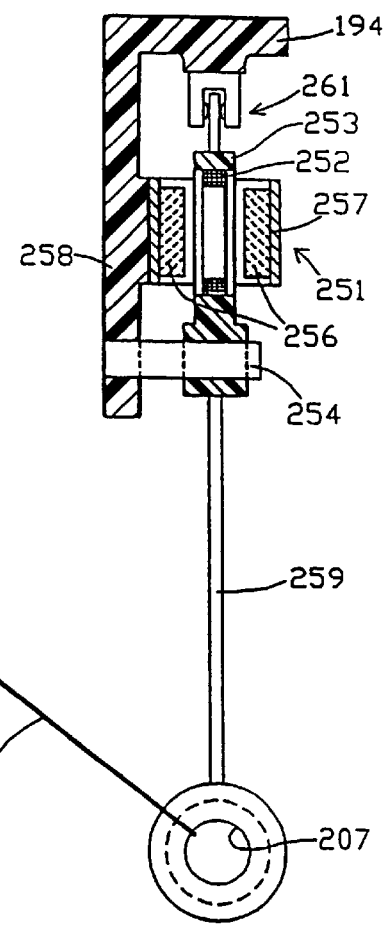
FIG. 20
FIG. 21

DEVICE AND METHOD TO CONTROL YARN TENSION AND YARN FEEDER

FIELD OF THE INVENTION

This invention relates to a device for controlling tension of a running yarn subjected to rapidly varying stresses to a yarn feeder for feeding yarn to a weaving machine, and to a method for measuring the tension of a yarn at the outlet of a yarn feeder.

BACKGROUND OF THE INVENTION

Controlling yarn tension is very important in order to achieve maximum effectiveness in many weaving operations, such as insertion of the weft yarn in a high-performance loom, like the modern shuttleless looms, or feeding of a group of yarns to a warping machine, or still other operations. In all these activities, the way in which the yarn is drawn off is such that yarn tension may vary considerably. A particular case is insertion of weft yarn in a shuttleless loom, where the yarn is fed in at extremely high and extremely variable speed, causing tension peaks in the yarn that may even result in the yarn breaking.

Mechanical devices are known which control yarn braking in relation to yarn tension, so as to maintain a substantially constant tension in the yarn, far from very high values and exempt from sharp variations. These are equipped with brakes that react mechanically to the tension existing at any moment in the yarn, so that the braking force exerted by the brake on the yarn decreases as the tension increases and, conversely. Braking is mechanically modulated in relation to the yarn tension value. Mechanical devices generally have a slow response time in detecting variations of tension occurring at high frequency. These drawbacks derive from the fact that the yarn tension is detected to modulate braking by using mechanical parts engaging with the yarn and that are prone to move during the yarn tension variations. Though of very small mass, these mechanical parts nevertheless have an inertia and an elasticity that are such that, they interact dynamically with the yarn exchanging kinetic and elastic energy with it, especially in cases of a sudden variation in yarn tension. These dynamic variations slow down the response and diminish the efficaciousness of these devices to control the brake and, as a result, the yarn tension. Moreover, the dynamic interaction of mechanical parts and yarn has an unsettling effect on existing yarn status, and may thus considerably modify yarn tension, especially when the tension varies extremely rapidly and the dynamic interactions between these mechanical parts and the yarn occur continuously. These known devices are, in addition to their slow speed of reaction to tension variations, never completely passive with respect to the yarn in detecting its tension and always alter its value to a certain extent, thereby reducing efficaciousness of braking modulation. Furthermore, these known devices do not measure the absolute or numeric value of yarn tension but are limited to detecting relative variations of tension in order to control yarn braking.

As known devices do not possess a feature whereby the effective tension value is visualised this prevents these devices from being set accurately and permits only an empirical regulation (generally performed 'by feel' by an operator).

U.S. Pat. No. 5,316,051 shows a truncated cone-shaped cap fitted on the front end of the drum of a yarn feeder to press directly on the yarn coming from the reserve and passing between cap and drum. This brake exerts a braking force on the yarn that is responsive to the tension in the yarn when exiting from the brake itself. In fact, this exiting yarn tension gives rise to a tension component oriented axially and apt to act retroactively on the cap for being subtracted from the braking force exerted by the cap on the yarn. The axial tension component causes a reduction of the braking force. Therefore, if yarn tension tends to rise, the brake reduces its braking force proportionally. This brake reduces yarn tension peaks and smoothes the tension pattern, but cannot completely cease from braking on the yarn, i.e. the yarn can never be disengaged from the brake completely to reduce yarn tension as much as possible. This brake cannot entirely nullify the tension at the brake outlet. The yarn always remains engaged with and is thus braked by the cap.

Devices are known to control yarn tension that are used on a yarn feeder, and include yarn tension gauge attached to the eyelet coaxial with the feeder drum. Tension measurement is obtained by measuring the variation of parameters due to axial displacement of the eyelet, because of the force dependent on yarn tension. The eyelet is thus left free to move in the axial direction under the action of this force. These devices have the tendency to exchange kinetic and/or elastic energy with the yarn, thus leading to the risk of the eyelet starting to vibrate. These inconveniences mean that tension measurement is generally affected by error and is thoroughly unreliable when yarn is drawn off from the drum at extremely high and rapidly varying speed.

One object of this invention is to provide a yarn tension control device having a very high response speed and high precision in measuring yarn tension.

A further task of the present invention is to provide a yarn tension control device that visualises the effective tension values, so that the latter may be of use to an operator for convenient setting of the desired tension threshold values and also make it possible to subsequently control deviation in time of the tension from the desired values, so that action may be taken if the deviations are found to be anomalous.

Another object of this invention is to provide a yarn tension control device which, as well as measuring yarn tension, also has a very high response speed and high precision in varying braking force on the yarn, so as to intervene in an effective and timely manner to correct yarn tension and maintain it substantially within a programmed pattern, especially when the yarn is subjected to stresses varying extremely rapidly while it proceeds along its path and which is also able, as required, to disengage from the yarn and thus completely annul braking on the latter.

According to another aspect of the invention, the movable guide element engaging the yarn is associated with elastic yarn retracting means, which can be regulated manually and which are arranged between the movable guide element and the yarn tension sensor means in order to retract the yarn and keep it constantly under tension, preventing it from becoming slack.

According to another aspect of the invention, the motor of the yarn tension sensor means may be used for positive driving of the guide element so as to retract and tension the yarn in cases where it tends to become slack as, for example, at the end of a cycle of weft yarn insertion in a shuttleless loom.

The device of the invention is particularly advantageous on shuttleless looms due to its capacity to control weft yarn braking during the insertion stage as a function of the tension effectively acting in the yarn and not, as is the case in known systems, in a way dependent on or synchronised with the loom cycle. The inventive concept permits the control of yarn tension at the outlet of a yarn feeder, during the feeding of yarn at high speed into a weaving machine. The yarn passes through an eyelet at high speed and exerts a force on the eyelet that is dependent on the tension of the yarn.

The device and method offer considerable advantages, such as that of not altering the path normally followed by the yarn in the yarn feeder as it unwinds and that of being able to obtain a yarn tension measurement from a tension component apt to assume a significant value, i.e. similar to that of actual tension of the yarn. In fact, the device of the invention utilises to advantage the deviation that the yarn undergoes in passing through the eyelet coaxial with the drum on its way to the weaving machine. This arrangement of the eyelet with respect to the drum is such as to produce a very high angle of deviation of the yarn, in correspondence with the eyelet, as the yarn reaches the eyelet along a path that is radial with respect to the drum, coming from its outer cylindrical surface, whereon the yarn reserve is located. The effect of said high deviation is that the force the yarn exerts on the eyelet and which is proportional to both the tension to be measured and to the deviation undergone by the yarn, assumes a very significant value, similar to that of the tension and apt to permit a precise and reliable measure of the said tension.

A preferred embodiment of the invention relates to a yarn tension control device including a guide element which engages the yarn and is subject to a force proportional to the tension of the yarn, and a yarn tension sensor means which detects the tension in the yarn through the guide element. The yarn tension sensor means includes a control circuit, electromagnetic control means to which the control circuit supplies current and which is provided with a moveable control element operable electromagnetically and a position sensor. The moveable control element moves along with the moveable guide element, and the position sensor emits a signal indicative of displacements of the moveable control element from a determined measuring position and corresponding to displacements of the guide element caused by said force proportional to the tension of yarn. The control circuit supplies the electromagnetic control means with current to generate a magnetic control force for the control element for maintaining same substantially motionless in the determined measuring position during variations of tension of yarn. This current supplied to the electromagnetic control means is indicative of the yarn tension, and the current is measured by the tension sensor means to generate a signal indicative of the tension.

BRIEF DESCRIPTION OF THE DRAWINGS

FIG. 8 is a graph showing the time course of operating parameters of the device;

FIG. 9 is a perspective view of the device of FIG. 1 equipped with mechanical coupling means;

FIG. 11 is a diagrammatic representation of a first form of a damper useful on the device of FIG. 1 and the device of FIG. 3;

FIG. 20 is a third variant of the device of FIG. 17;

FIG. 21 is a front view in enlarged scale of some details of the variant of FIG. 20;

FIG. 22 is an enlarged scale view of a different embodiment of the variant of FIG. 20;

DETAILED DESCRIPTION

Figure 1:
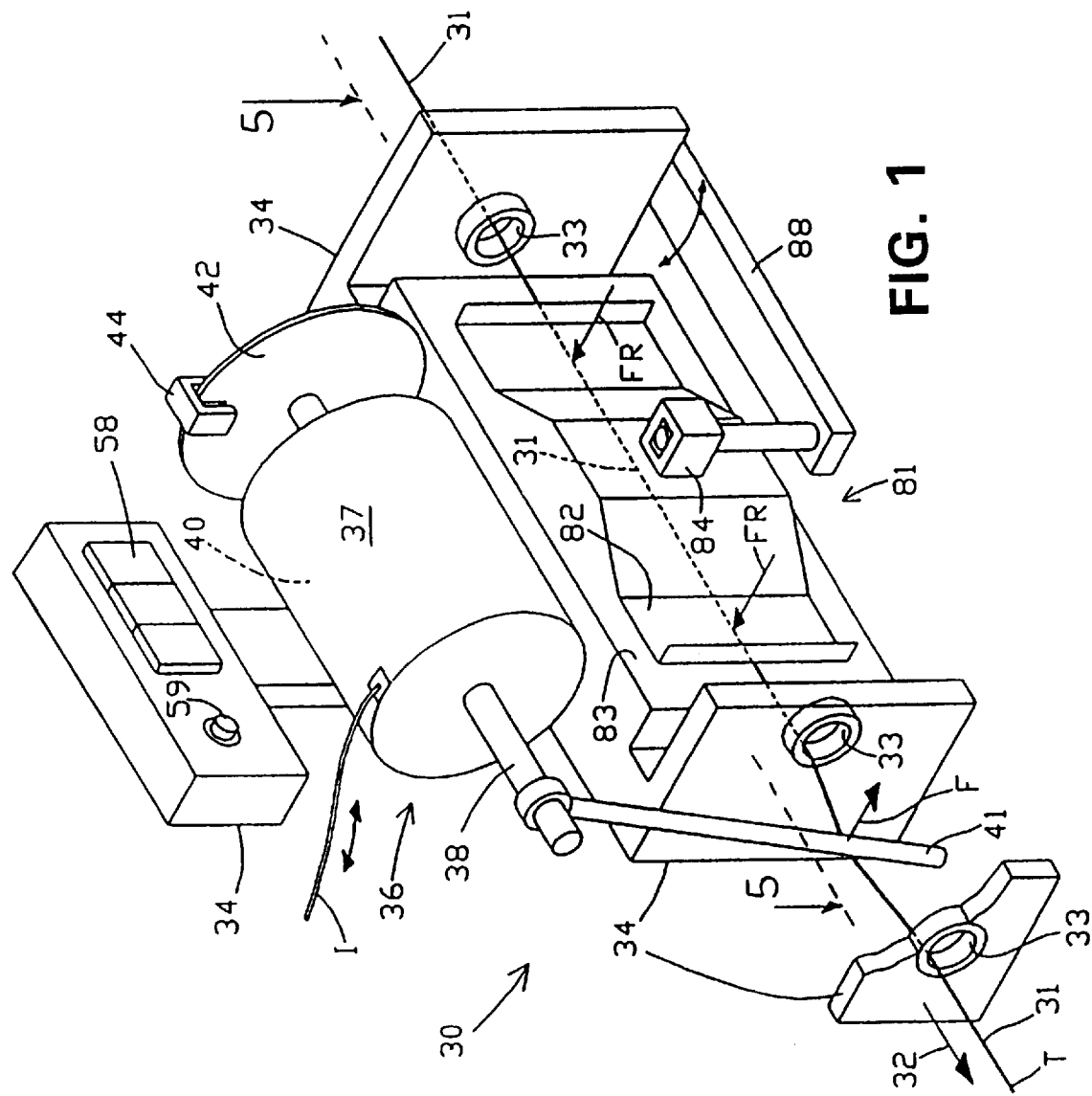
FIG. 1 is a perspective view of a device for controlling yarn tension.

In FIG. 1, a device 30, acts on a yarn 31 which moves along a path in a direction indicated by arrow 32. The yarn is guided by eyelets 33 mounted on a fixed structure 34 of the device 30. Yarn tension sensor means 36 suitable for measuring the yarn tension, (also called "tension gauge" hereinafter), are provided to act, by means of a guide element engaging the yarn 31, on a portion of the yarn. The tension sensor means 36 includes electronic control means having a movable control element driven by an electromagnetic force.

The electromagnetic control means and the relative movable control element can be embodied by a direct current motor 37 attached to the structure 34 and its rotor 40. The latter rotates about a casing of the motor 37 and has a shaft 38 protruding from the casing. The movable guide element includes, for example, a rod 41 which is attached to the shaft 38 and acts on the yarn portion, upon which the yarn tension sensor means 36 acts based on a rectilinear trajectory between the two eyelets 33.

A generic deviation of an angle $\alpha$ (FIGS. 3 and 5) produced by the rod 41 on the yarn with respect to the rectilinear trajectory automatically results in application of a force F by the yarn 31 on the rod 41. The value of F, assuming negligible friction between yarn 31 and rod 41, is equal to $2T\sin(\alpha)$, where T is the tension in the yarn. The tension gauge 36 also comprises a disk 42 which is integral with the rotor 40 of the motor 37, and which is equipped with a slot 43 (FIG. 6). The slot is aligned with a position sensor 44 and, under these conditions of alignment, establishes a determined measuring position (hereinafter also called reference position) of rotor 40 and rod 41. In this measuring position of rod 41, there is a given angular deviation α of the yarn 31. To signal alignment of the slot 43 with the sensor 44, the latter is equipped with optical elements 46 apt to detect each displacement of the slot 43 from the alignment condition, and hence of the rod 41 from the measuring position.

Other types of sensors, for example, Hall effect or inductive sensors may be used to signal displacements of the rod 41 from the measuring position. This position may correspond to a very low angle of deviation α of the yarn, of only a few degrees, so that the additional tension induced in the yarn 31 by its sliding on rod 41 is practically negligible.

Figure 2:
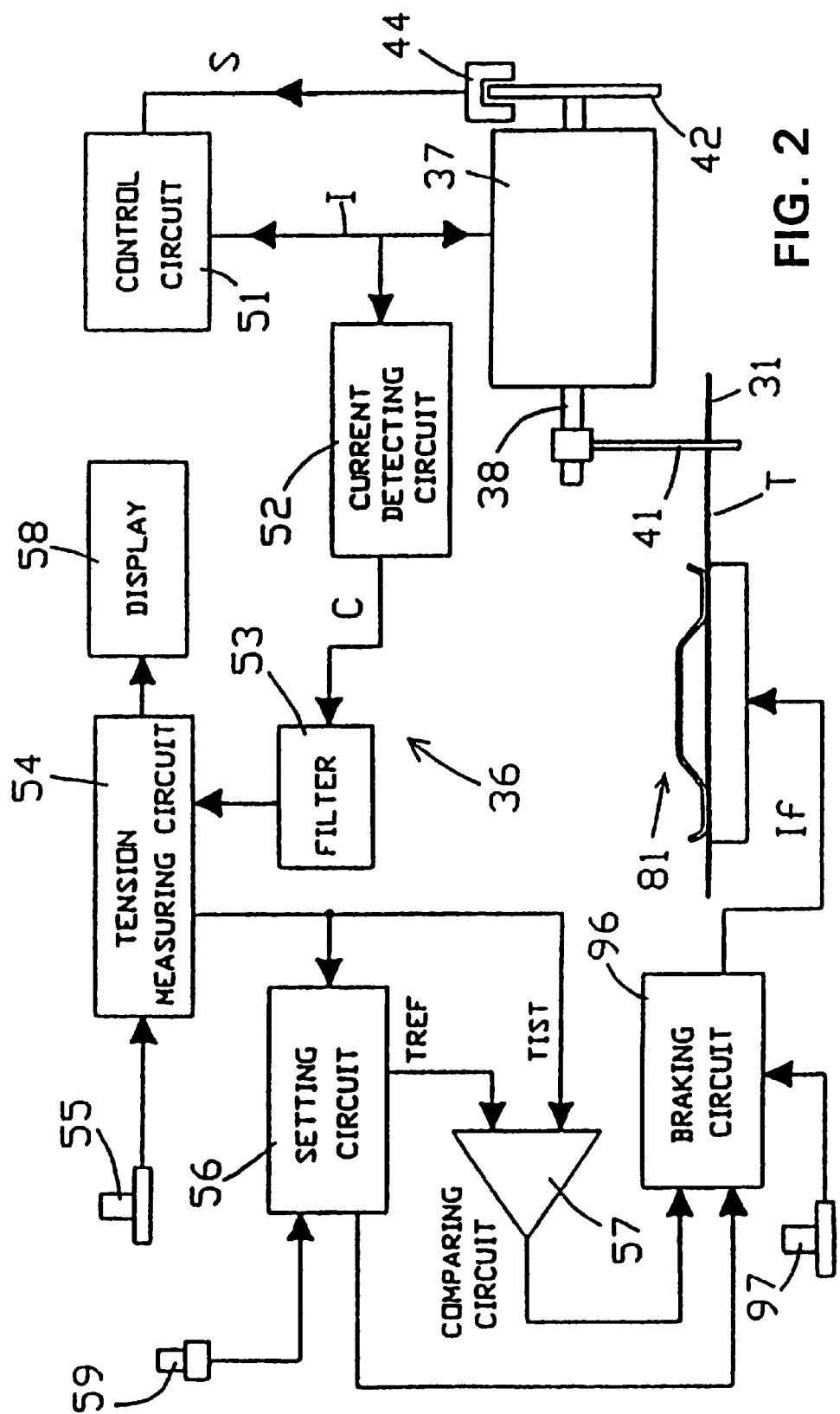
FIG. 2 is an electrical block diagram of the device of FIG. 1.

In FIG. 2 blocks of the diagram refer to elements already described in the foregoing and are therefore indicated with the same numbers. A control circuit 51 receives from the sensor 44 a signal S indicative of displacements of the disk 42 with respect to the position where it is aligned with sensor 44 and hence also of the displacements of rod 41 with respect to its measuring position. On the basis of this signal S, the circuit 51 powers the motor 37 with a current I of intensity and direction such as to maintain disk 42 substantially motionless in the alignment position, instantaneously balancing the resistive torque that the force F applies on shaft 38 through rod 41, whatever the value of force F and hence of the tension T acting on the yarn 31 which is calculated as (F=2Tsin(α)).

Generation of oscillations in the current I ought to be avoided whenever the current varies rapidly in value. The oscillations can normally be attributed to secondary oscillation phenomena and could, if highly marked, give rise to instantaneous yarn tension measuring errors. On this subject, a particularly advantageous form of construction of the control circuit 51, and to which reference will be made by describing the variant of FIG. 13, involves the use of the digital control technique.

As rod 41, rotor 40 of motor 37 and disk 42 remain practically motionless during variations of tension, this prevents their inertia and elasticity from having a negative, unsettling impact on detection of tension T. Rod 41, rotor 40 and disk 42 behave as if they were virtually still and free of inertia and elasticity in detecting the tension T of the yarn 41. The control circuit 51 can drive motor 37 in a PWD-mode (Power With Modulation) to supply power to the motor 37 in pulsing mode and cause I to vary analogically. When the yarn 31 is not subjected to any tension, rod 41 and rotor 40 are not under stress either, and hence the current I assumes a null or extremely low value that corresponds to a minimum current threshold for controlling position of rotor 40, when there is no torque acting thereon. When there is a tension T in the yarn, the rod 41 is subjected to a force F proportional to the tension and applies a resistive torque on rotor 40 of motor 37. The resistive torque is equal to the product of F by its arm with respect to the axis of motor 37, and is balanced by an active torque generated by the current I. As the active torque generated by a direct current motor is proportional to the current with which the motor is supplied, the force F and hence the tension T in the yarn 31 are proportional to the current I.

Current I and tension T are proportional for all values of the angle α of deviation of the yarn 31. Assuming T remains constant, current I tends to drop as α decreases, since F also decreases correspondingly. The device supplies a current I indicative of the tension T, even for very low values of angle α, under 10°, so that sliding of the yarn 31 on the rod 41 is practically incapable of influencing tension T of the yarn 31.

A circuit 52 (FIG. 2) for detecting the current I is connected to the line supplying the motor 37 with current I and has high impedance so as not to influence the value of I. In turn, circuit 52 generates a signal C, indicative of the current I. Preferably, signal C is processed by a filter circuit 53, to filter signal C of the oscillations and noise typically inherent in operation of the control circuit 51. The filter 53 generates a filtered signal indicative of the current I, which is sent to a tension measuring circuit 54 which measures yarn tension. The measuring circuit 54, in turn obtains from this filtered signal the effective value of yarn tension and to enables visualisation of this value on a display 58. The circuit 54 updates the tension value on the visualizer 58 with a frequency much lower than the measuring frequency in order to allow the tension value to have a certain stability on the display 58 and thus to be read with ease.

For calibrating the measuring circuit 54, a potentiometer 55 is provided for being regulated. The tension value visualised by the indicator 58 ought to coincide with a sample value for tension of the yarn 31 provided by an external measuring appliance, a dynamometer for example, applied on the yarn 31 to pull it in the direction of the arrow 32 while potentiometer 55 is regulated.

A setting circuit 56 receives a yarn tension measuring signal from circuit 54 and is connected to a push-button 59, or to a functionally equivalent element. The push-button 59 may be actuated by the operator to store a reference value TREF corresponding to a set tension value in the setting circuit 56. In practice, the operator varies yarn tension manually and, on observing a tension value on indicator 58 equal to the value that he wishes to set, actuates push-button 59, thereby storing the TREF value in circuit 56.

Figure 3:
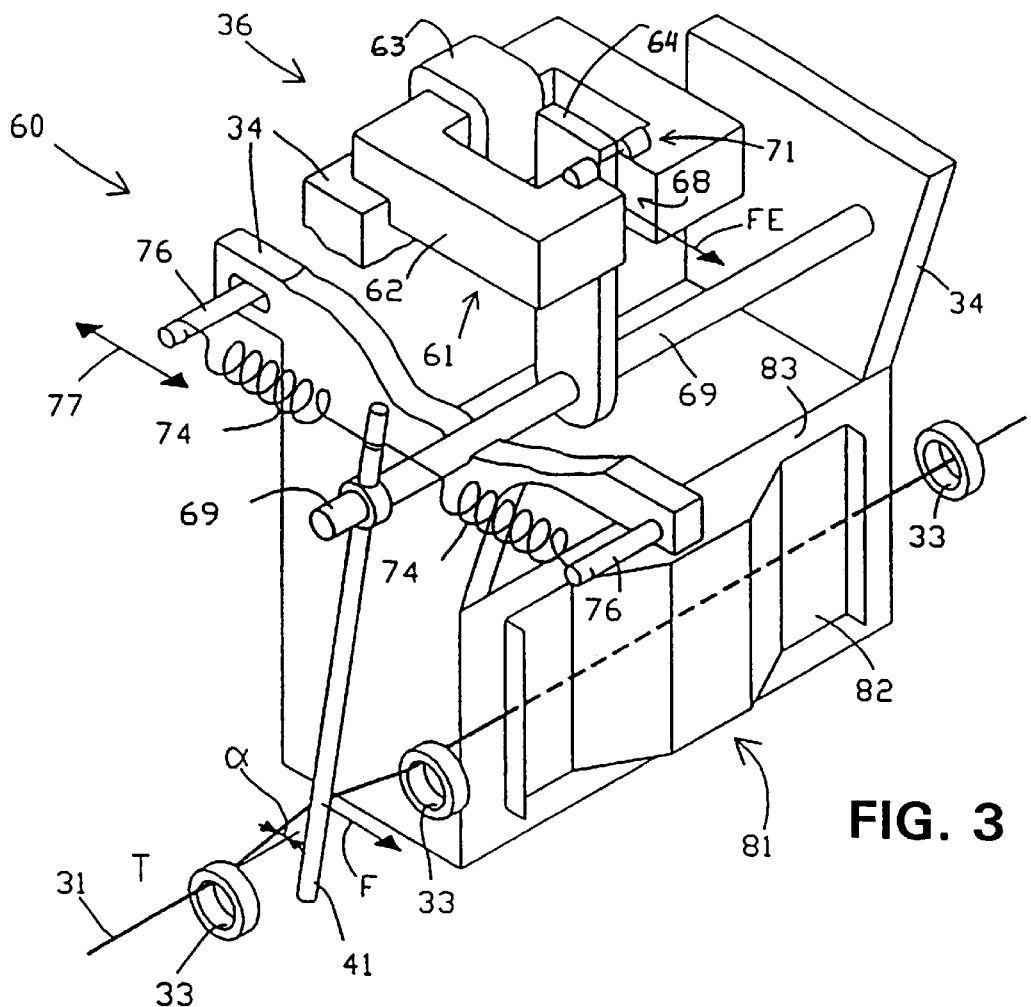
FIG. 3 is a perspective view of a variant of the device of FIG. 1.

FIG. 3 represents a device 60 similar to FIG. 1, in which the tension gauge 36 uses an electromagnet 61 in place of the direct current motor 37. This electromagnet 61 is attached to the fixed structure 34 and comprises a core 62, a coil 63 wound around the core 62 and an armature 64 disposed between two extensions 66 and 67 (FIG. 4) of the core 62. The armature 64 has an end portion which together with the end surfaces of the extensions 66 and 67 defines an air gap 68. The core 63 is supplied with a current I' (FIG. 4) by the control circuit 51 (FIG. 2) and generates a magnetic field apt to be which is conveyed by the core 62 to the air gap 68, to cross it and to produce in correspondence therewith a magnetic force FE suitable to attract the armature 64 towards a position corresponding to a state of minimum reluctance of air gap 68. Armature 64 is attached to a shaft 69 rotatably coupled to the fixed structure 34 such that the armature 64 is moved longitudinally with respect to the end surfaces of extensions 66 and 67.

Figure 4:
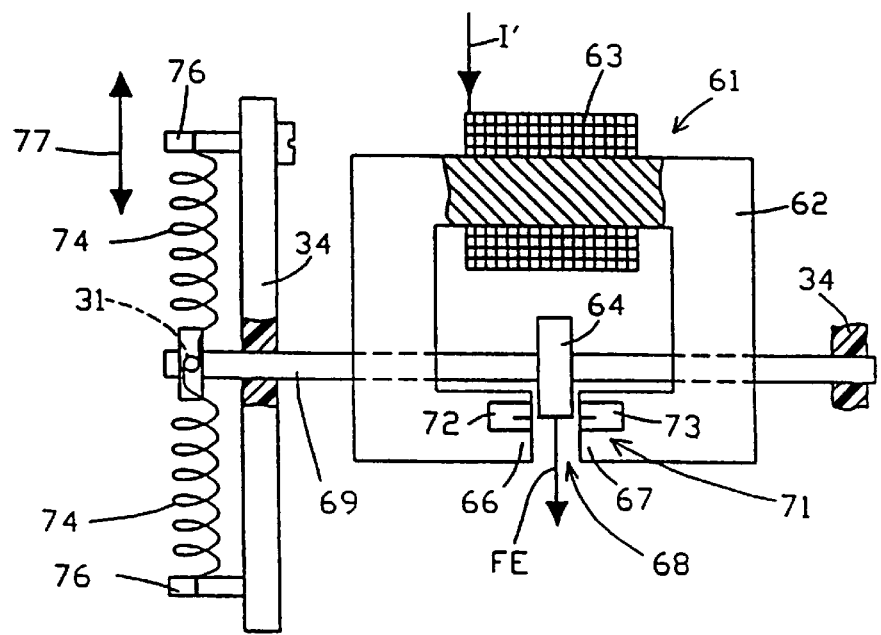
FIG. 4 is a top view, partially sectioned, of the variant of FIG. 3.

An example of armature 64 and of extensions 66 and 67 and their disposition in defining the geometry of the air gap 68 is illustrated in FIG. 4. Magnetic force FE tends to move the armature 64 towards the inside of the space between extensions 66 and 67, increasing the area of the armature sides which face the respective end surfaces of the extensions 66 and 67. Furthermore, this geometry of the air gap 68 is such as to determine a substantially constant course of force FE for a given current I' supplied to coil 63, along a fairly wide longitudinal displacement of armature 64 with respect to extensions 66 and 67. This property of air gap 68 depends chiefly on the fact that it does not vary substantially in its geometry while armature 64 moves, since the sides of the latter stay at a constant distance from extensions 66 and 67. The shaft 69 is arranged substantially parallel to the portion of yarn 31 on which the tension gauge 36 acts and supports at one end the rod 41 which engages the yarn 31 to deviate same by the angle α. A position sensor 71, of the optical type for example and including an emitter part 72 and a receiver part 73, is aligned with one corner of the armature 64 to signal each displacement of the latter from a fixed reference position with respect to extensions 66 and 67. The reference position is selected within the field of displacement of armature 64 with respect to extensions 66 and 67, within which field the pattern of magnetic force FE assumes a practically constant value.

In electromagnet 61, the magnetic force FE acting on armature 64 assumes a single direction, which is that of reducing reluctance of the air gap 68. Unlike the motor 37 which exerts on its rotor 40 active torques having opposite directions to move the rotor in both directions, the magnetic circuit of electromagnet 61 is usually capable of activating magnetic forces suitable to act on armature 64 in a single direction, irrespective of the direction of the current I' in coil 63.

In order to cooperate with the magnetic force FE in keeping armature 64 substantially motionless in its reference position, armature 64 is associated with elastic positioning means, for example, two springs 74. The springs 74 at one end are fastened to posts 76 extending from the structure 34, and at opposite ends are attached to rod 41. One or both of these posts is adjusted in the direction of arrow 77 to regulate rod 41 in the exact measuring position corresponding to the desired angle of yarn deviation α from the rectilinear feed trajectory of yarn 31 between the two eyelets 33.

The electrical diagram relative to the device 60 is substantially equivalent to the one shown in FIG. 2. Current I, motor 37 and sensor 44 in the diagram of FIG. 2 is replaced with current I', electromagnet 61 and sensor 71; in additional, the control circuit 51 feeds the current I' to the electromagnet 61 of device 60 differently with respect to how it feeds current I to the motor 37 of device 30. In device 60, control circuit 51 does not need to feed current I' to electromagnet 61 in two opposing directions. This is unlike the case of device 30, in which the current I may be fed to motor 37 in two different directions in order to generate deflecting torques apt to act in opposition on rotor 40 to hold it in the measuring position.

Control circuit 51, in response to signals received from sensor 71 indicating displacements of the armature 64 from the measuring position due to variations of the tension T of the yarn 31, feeds the coil 63 with the current I' so that the magnetic force FE activated by this current I' generates a torque with respect to the shaft 69 sufficient to counteract the torque produced, again with respect to shaft 69, by the force F that yarn 31 exerts on the tip of the rod 41.

Regarding activation of the magnetic force FE by the current I' to counteract the force F, force FE, which follows a substantially constant course for a wide field of displacement of armature 64 with respect to its measuring position, may easily be controlled by the current I' to rapidly assume a value which counteracts the force F.

The signals used by circuit 51 to provide the current I' are solely those indicating displacements of armature 64 in the direction opposite that of the force FE, namely the displacements that can be referred directly to variations of the tension T of the yarn 31. Any signals of displacements of armature 64 in the same direction as that of the force FE are used by the control circuit 51 to cancel the current I', so that it is only the springs 74 that bring armature 64 back to the measuring position. Accordingly, the action of springs 74 suffices to make up for the impossibility of the force FE produced by the electromagnet 61 to act from opposing directions on armature 64, as has already been stated on several occasions.

The magnetic force FE acts in a single direction. The elastic force each of the springs acting symmetrically from two opposing directions on rod 41 co-operate with one another in order to counteract all displacements of the rod 44 away from the measuring position during variations of the tension T of yarn 31. The equilibrium with respect to the shaft 69 of the torques produced by the forces FE and F and by the elastic force of springs 74 is constantly restored by varying the current I' in function of displacements of armature 64 from its reference position and hence rod 41, shaft 69 and armature 64 remain substantially motionless during variations of the tension T of the yarn 31. Thus, the current I' is indicative of the tension of the yarn 31 and is measured by the measuring circuit 54 (FIG. 2) in a way substantially equivalent to that already described for the device 30.

A brake 81 (FIG. 1 and FIG. 3) may be coupled with the yarn tension sensor means 36 to act on a yarn portion before the latter reaches rod 41 and consequently its tension is detected by the yarn tension sensor means 36.

Figure 5:
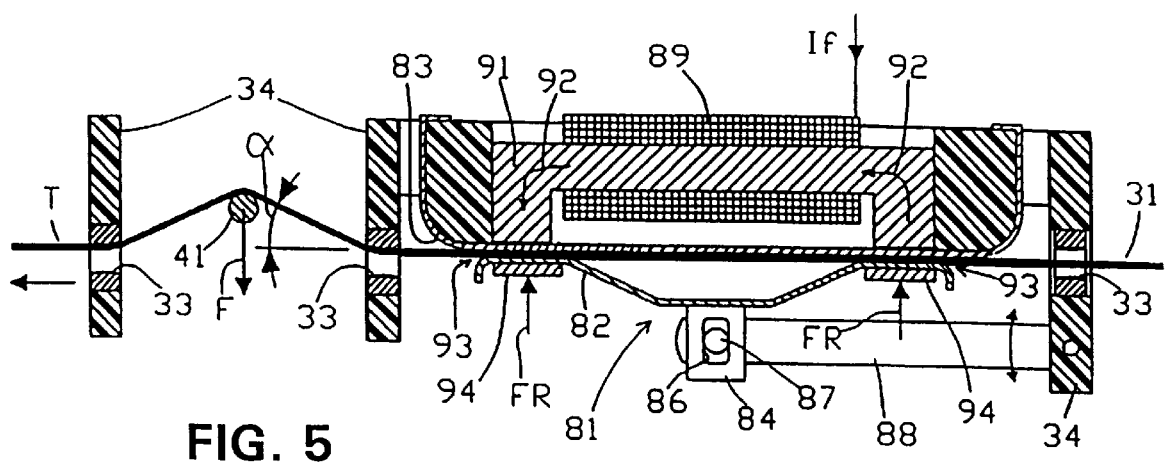
FIG. 5 is a cross-section taken along the line 5—5 of FIG. 1 or in the variant of FIG. 3.
Figure 6:
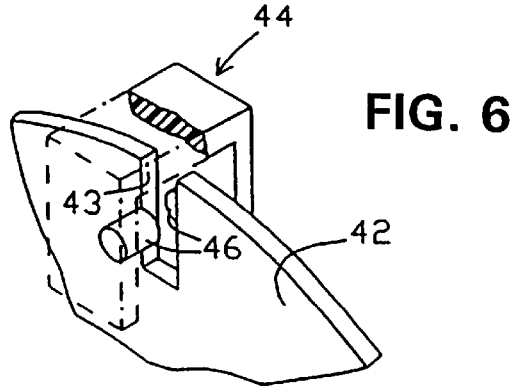
FIG. 6 is an enlarged scale view of a detail of FIG. 1.

In FIGS. 1 and 5, brake 81 includes two pressure elements 82 and 83, facing and pressing against each other with the yarn 31 interposed between them. In one example, the elements 82 and 83 can be plate-shaped. Element 82 is fixed and integral with the structure 34. Element 82 is free to move to vary its distance from element 83 as a function of cross-sectional size of the yarn 31. Element 82 includes a block 84 equipped with a slot 86 which allows block 84 to slide along a pin 87 of an arm 88 connected to the structure 34.

Pressure elements 82 and 83 are pressed together by way of a magnetic circuit comprising the element 82, a core 91 and a coil 89 wound on the core 91, wherein the latter are both integral with the structure 34 and are disposed adjacent element 83. Pressure element 82 is of a ferromagnetic material, unlike element 83 which is of a non-magnetic material, stainless steel for example, and thus element 82 permits the closing of a loop of magnetic flux 92 on core 91 generated by the coil 89 when the latter is supplied with a current If. With core 91, the element 82 defines two air gaps 93 corresponding to the areas in which the distance between the pressure elements 82 and 83 is smallest and in which a force of attraction is generated magnetically between the latter elements, constituting the braking force FR effectively exerted on the yarn 31. Attraction members 94 of ferromagnetic material are mounted on plate 82 in correspondence with the air gaps 93 and allow force FR to be increased.

The push-button 59 (FIG. 2) is used to condition operation of the brake 81. Push-button 59 can be activated in two modes or positions, in the first of which in addition to storing the TREF value, it also enables a braking circuit 96 of the brake 81 to operate under a modulated braking condition. After activating push-button 59 in this first position, the TREF value remains constant and does not undergo any alteration until the push-button 59 is activated again in this first position. In the second position, push-button 59, by way of setting circuit 56, switches operation of the braking circuit 96 from the modulated braking mode to a constant braking mode, in which brake 81 is powered with the constant current If and, consequently, generates a constant braking force on yarn 31.

A comparing circuit 57 receives both the TREF value and a value TIST supplied by the measuring circuit 54, which corresponds to the instantaneous yarn tension value, and outputs for the braking circuit 96 a signal indicating which of the two values, TREF or TIST, is the higher. If circuit 57 signals that the TIST value is higher than the TREF value and the braking circuit 96 is set for modulated braking operation, the braking circuit 96 automatically reduces either entirely or in part the current If supplied to brake 81, thereby cancelling or at least reducing braking on the yarn 31. Conversely, if comparing circuit 57 signals that TIST is below the value of TREF, the braking circuit 96 starts powering the brake 81 again with the current If, restoring it to its nominal value either instantaneously or progressively and thereby increasing braking on the yarn 31.

When the braking circuit 96 is adjusted by push-button 59 for constant braking operation, the result of the comparison made by circuit 57 does not signal circuit 96 and the latter continues to exert a constant braking on the yarn. Circuit 96 can be regulated manually by a potentiometer 97 to set the braking in constant braking mode, or to set the nominal value of the current If and thus of braking which, in modulated braking mode, corresponds to the threshold value TREF. In the latter case, the potentiometer 97 and the push-button 59 may be used together, by first operating on potentiometer 97 to vary yarn braking manually and change the tension value visualised on the indicator 58 until the value visualised is that of the TREF value desired and then, at this point, by activating push-button 59 to set this value for TREF.

Figure 7:
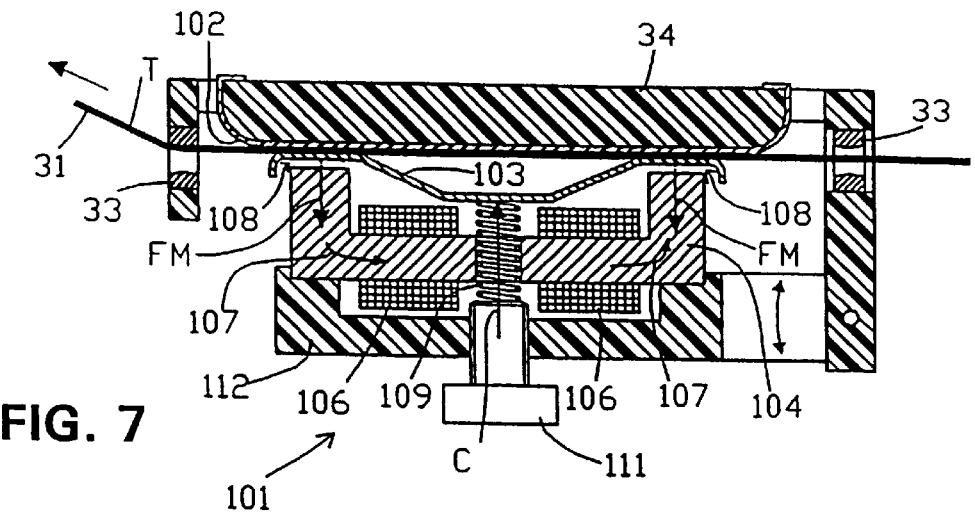
FIG. 7 is a variant of the brake of FIG. 5.

FIG. 7 represents device 101 (variant of brake 81) in which the magnetic circuit is disposed completely on one side with respect to a fixed pressure element or plate 102 of non-magnetic material. The magnetic circuit comprises a pressure element 103, also plate-shaped and constructed of ferromagnetic material which acts as a movable armature, a core 104 and one or more coils 106 wound on the core 104 and which are supplied with a current to generate a magnetic flux 107. The core 104 and the plate 103 define between them air gaps 108, which are traversed by the flux 107 to generate magnetic forces FM. Unlike the brake 81 of FIG. 5, the air gaps 108 do not close the magnetic flux through the surfaces of plates 103 and 102 in contact with the yarn.

Plate 103 is pushed by a spring 109 against plate 102 that is fixed to the core 104 to exert a pressure on the yarn 31 passing between plates 103 and 102. The charge C of the spring 109 on plate 102 can be adjusted manually, by varying the length of the spring 109 by means of a knob 111 equipped with a leg which screws into a support 112. The support 112 rotates on the structure 34 in order to move plates 103 and 102 away from each other The movable plate 103 is supported to move perpendicularly with respect to the fixed plate 102 and also to counteract the tangential force to which it is subjected by the yarn 31 because of the sliding friction thereof on plate 103. For example, plate 103 can be equipped with a pin which slides along a corresponding hole (not shown) of the core 104.

In device 101, the magnetic forces FM generated by the flux 107 move plate 103 away from plate 102 against the action of the charge C of spring 109 in order to reduce yarn braking. In this case, the magnetic forces FM increase and has have a negative action on tension T of the yarn 31 and therefore tension T of the yarn 31 decreases. Brake 101 can also operate both in constant braking mode, in which braking is fixed and is set by varying the load C through the knob 111, and in modulated braking mode in which the coil 106 is supplied with current to generate the forces FM in response to the comparison of a reference value TREF with an instantaneous tension value TIST as described for brake 81.

Compared to brake 81 and in the constant braking mode, the brake in device 101 has the added advantage of not absorbing energy as no current flows through coil 106. Moreover, should the magnetic forces FM prevail over the force C of spring 109, the plates 103 and 102 would open and the yarn 31 would be freed completely from their grasp.

This characteristic of being able to open and close the plates with respect to the yarn 31 may also be achieved on the brake 81 described earlier simply by providing the latter with a spring (not shown in the drawings) which exerts on plate 82 a force with a direction opposite that of the forces FR in such a way that when the latter become null, plate 82 moves away from plate 83. For example, this spring may be housed inside the slot 86 and act between the block 84 supporting plate 82 and the pin 87 to make block 84 slide on pin 87 away from the brake 81.

Plates 82, 83 and 103, 102 of brake 81 and brake 101 respectively can be rigidly associated to vary braking force when the brake 81 and the brake 101 work in modulated braking mode. In both brakes, the air gaps 93 and 108 are placed adjacent to the surfaces of the plates which are in contact with the yarn. The magnetic force generated in the air gaps acts directly on these surfaces and in fact prevents the plates from behaving in an elastic fashion, which could disturb control of the braking force during its variations resulting from the corresponding magnetic force variations. An elastic behaviour is unfavourable and depends essentially on the fact that the plates may bend or become deformed, thereby acquiring elastic energy for increasing their reciprocal pressure. This elastic energy is then released by the plates when they reduce their pressure. In modulated braking mode, this elastic energy reduces the speed with which braking force is controlled, and this renders braking modulation less efficacious. According to the above-mentioned characteristic, no parts of the plates are subject to deformation during braking force variations nor can they store elastic energy, which is what would happen had the plates elastic parts been arranged between the air gaps in which the magnetic force determining braking force is generated and the surfaces of the plates that effectively brake the yarn and are in direct contact therewith.

FIG. 8 includes diagrams indicating different yarn tension patterns which result when the yarn is braked by a brake which, in the modulated braking mode described earlier, works in rigid mode, and when the yarn is braked by a brake working in elastic mode.

The unbroken line diagram 113 refers to the brake operating in rigid fashion and shows that when the tension T exceeds a threshold value Ts corresponding to the set tension TREF, and consequently the braking current If is cancelled or at least reduced, the yarn tension continues to increase only for a very short time Δt before returning rapidly to below the threshold value Ts.

The dashed line diagram 114, regarding the brake that operates in elastic fashion, clearly shows that, after Ts is exceeded, the tension tends to continue increasing for a time Δt1 considerably greater than Δt, and has a lengthy excursion above the threshold value Ts before returning below it. Therefore, in the case of the rigid brake, the current If will be made to vary with a high frequency (diagram 116 with the unbroken line), braking force will respond immediately to the current If and as a result a course of tension T will be obtained with minimum deviations from the threshold value Ts. On the contrary, in the case of the elastic brake, the current If will vary at a much lower frequency (diagram 117 with the dashed line), braking force will follow current If with a delay time and the deviation of tension T from the set value Ts will be greater.

For example, in place of a stepped variation of current If, like that shown in FIG. 8, where the current If goes instantaneously from a set, nominal value Is to a null value when the threshold tension Ts is exceeded, and vice versa, goes instantaneously from zero to the value Is when the tension drops below Ts, a ramp type variation may be achieved where the current If is made to vary gradually, both when the threshold tension Ts is exceeded and when tension drops below the threshold.

Moreover, in brakes 81 and 101 the parts arranged between the surfaces making contact with the yarn 31 and the gap in which the magnetic forces are generated, can be very light. Their lightness, together with their aptitude to operate in a rigid way without deformations, enables the brakes 81 and 101 to quickly and exactly control the braking of the yarn 31 in response to the commands of the yarn tension sensor means 36. In this way, the device of the invention is able to instantly to modify, that is in "real time", the normal course of yarn tension and to compel it to follow a desired course, even when the normal course is characterised by fast, frequent and high tension peaks induced by corresponding quick variations of the yarn advancing speed, as is the case of weft yarn fed or inserted into a modern shuttleless loom of the gripper, projectile or air jet type.

FIG. 9 shows device 120 which differs from the version 30 of FIG. 1 in that a mechanical coupling means is provided between the rod 41 and the motor 37 for the purpose of making shaft 38 rotate relative to rotor 40 with an angular rotation amplified with respect to that of rod 41. Device 120 accordingly acquires greater speed and precision of response with respect to device 30, while at the same time motors 37 of smaller size may be used. The greater speed and precision depend essentially on the fact that the angular displacements of disk 42 are amplified with respect to those of rod 41 and therefore the sensor 44 can signal with greater speed each angular displacement of rod 41 from its reference position as a result of variation of tension T of the yarn 31. In addition, smaller size motors 37 may be used given that the torque acting on them is lesser in inverse proportion to the amplification of the angular displacements of rod 41. The coupling means comprise two meshing gears 121 and 122, of which gear 121 has a greater pitch diameter than that of gear 122 and is attached on a shaft 123 rotatable relative to the structure, and the gear 122 is attached to the shaft 38 of motor 37.

Figure 10:
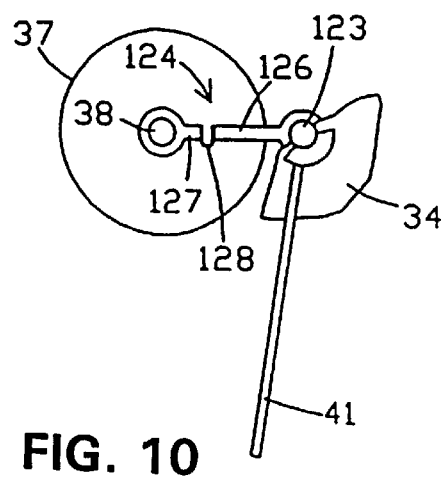
FIG. 10 is a variant of some details of FIG. 9.

FIG. 10 illustrates mechanical coupling means, constituted by an arm 124 divided into two parts 126 and 127, which are attached by one end respectively to shaft 123 and to shaft 38 of the motor 37 and have their other two ends connected together inside arm 124 by means of a deformable element 128. The part 126 is longer than part 127 and thus arm 124 transfers, after amplifying it, the angular displacement of rod 41 to shaft 38, simultaneously deforming element 128.

To damp possible mechanical vibrations, induced in the rod 41 and the rotor 40 by variations of tension, damping means 129 in FIG. 11 are provided which cooperate with rod 41 and rotor 40 to dampen displacements thereof. The damping means may comprise a rubber element 131 placed between the rod 41 and the shaft 38 of the motor 37.

Figure 12:
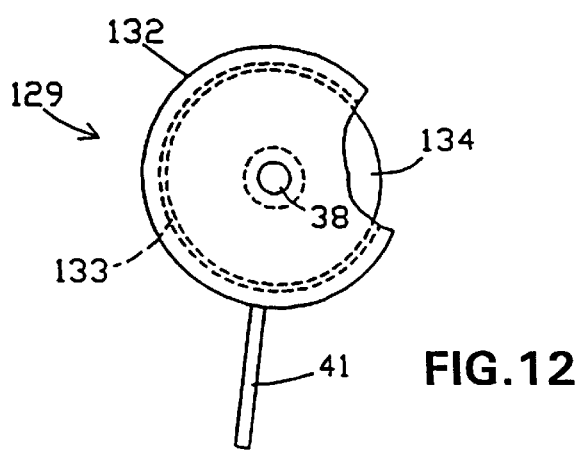
FIG. 12 depicts another form of construction of the damper of FIG. 11.

According to FIG. 12, the damping means 129 comprise a case 132 connected to the shaft 38 and bearing the rod 41, hermetically sealed and filled with a viscous fluid 133, and a mass 134 which is free to move inside the case 132, though the displacements thereof are braked by the viscous fluid 133 which occupies the space between case and the movable mass 134. The displacements of mass 134 take place later than those of the case 132 and the rod 41 because they are damped by the fluid 133 and, jointly by way of reaction, the rotating displacements of rod 41 and case 132 are also damped.

Figure 13:
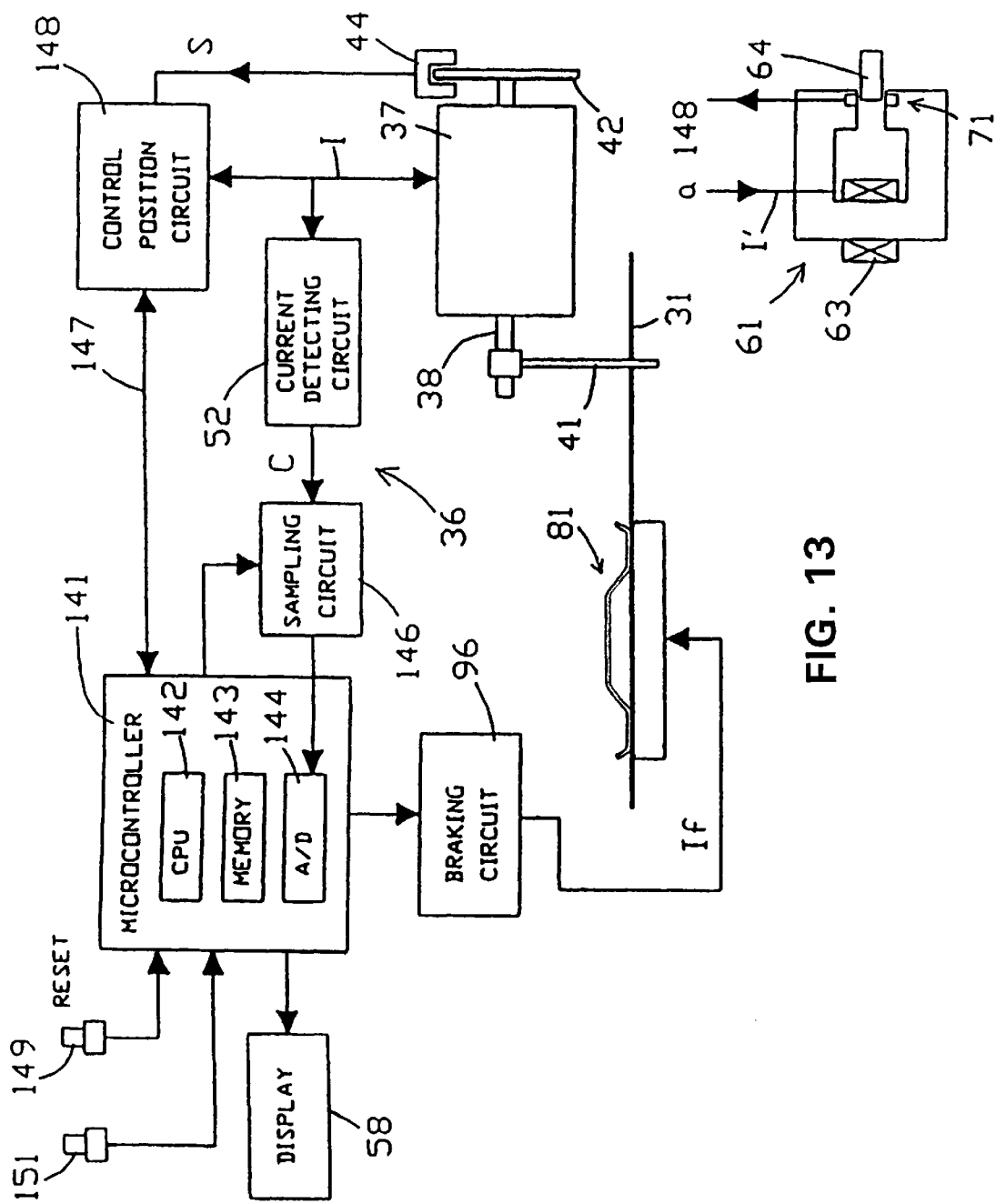
FIG. 13 is a variant of the block diagram of FIG. 2.

FIG. 13 illustrates one variant of the electrical block diagram of FIG. 2. In this variant, some circuits which in FIG. 2 were separate are now integrated in a single circuit or microcontroller 141. The latter is equipped with a computing section (CPU) 142, a memory 143 and an analogic/digital conversion section (A/D) 144, and receives, through the AND section 144, the values sampled by a sample & hold type circuit 146 of the signal C, which is in turn provided to circuit 146 by the current detecting circuit 52. On the basis of the sampled values, the microcontroller 141 commands the braking circuit 96 and the display 58, visualising on the latter the tension value measured for the yarn 31. Furthermore the microcontroller 141 is connected by way of a line 147, whereupon digital signals are transmitted in both directions to a position control circuit 148 which digitally controls motor 37. The microcontroller 141 and the position control circuit 148 are parts of a digital type position control which, has advantages over analogic type controls, such as having greater precision and speed and being practically insensitive to noise. In the memory 143 of microcontroller 141, a program is stored that manages the different operations of the device 30 of the invention. This program may carry out a plurality of functions, such as updating and visualising on display 58 the maximum value of tension T measured over a given period of time, the mean tension value calculated and other statistical data concerning behaviour of the tension over a given period of time, and still other functions. The values cited above can be either calculated and stored in the memory 143 in anticipation of a request from the operator to visualise them, or they can be visualised automatically at programmed intervals. The microcontroller can be conditioned by a RESET push-button 149 to reset the device 30, causing the above-mentioned program to start again from the beginning, and by one or more setting push-buttons 151 which are provided to set the threshold value Ts for the tension of the yarn 31 in a way similar to the push-button 59 in the case of operation of the device in modulated braking mode, or to set the device for constant braking mode operation.

The described electrical diagram is also applicable for device 60 of FIG. 3 in which the electromagnet 61 is used in place of the motor 37. FIG. 13 illustrates, close to the motor 37 and by way of alternative to the latter, electromagnet 61 with the sensor 71. The way in which current is provided by the position control circuit 148 differs from motor 37 to electromagnet 61, i.e. bidirectionally in the case of the motor 37 and unidirectionally in the case of the electromagnet 61.

Figure 15:
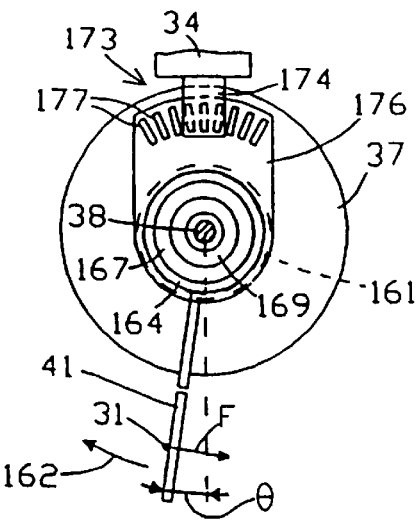
FIG. 15 is a front view of the variant of FIG. 14.
Figure 14:
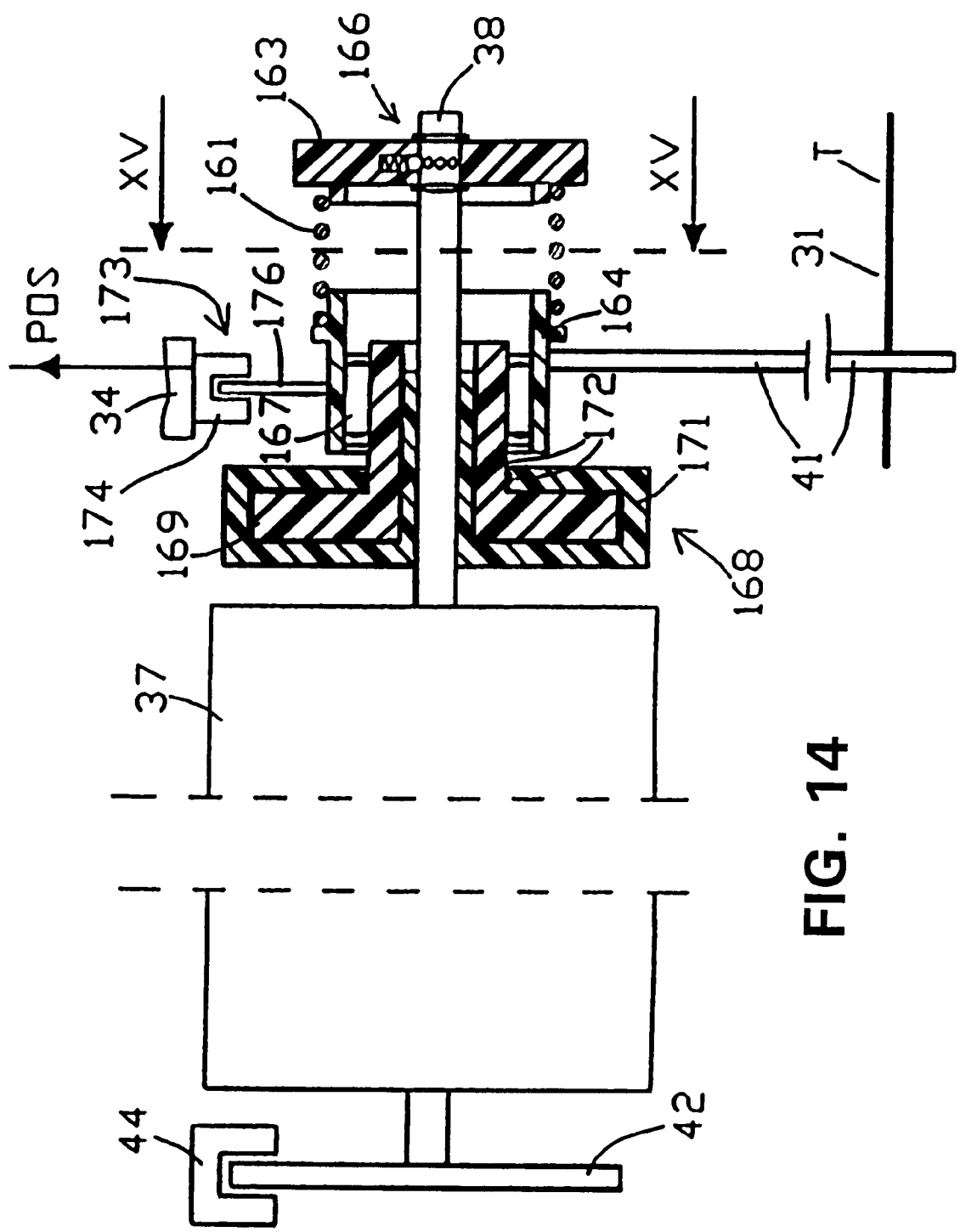
FIG. 14 is a lateral and partial cross-sectional view of a variant of the device of FIG. 1.

Rod 41, which serves as the guide element for yarn 31 in detecting tension T, can also act as a retractor for the yarn, when it tends to slacken. FIG. 14 shows that an elastic yarn retracting means including a spring 161 is arranged between the rod 41 and the shaft 38 and exert on rod 41 a torque that tends to cause it to rotate in the direction of the arrow 162 (FIG. 15). Therefore this torque acts on rod 41 in a direction opposite that of the force F generated by the yarn 31. The spring 161 consists of a series of windings disposed around the shaft 38 and has one adjustable end attached to an adjustment knob 163 and the other end connected to a sleeve 164. Sleeve 164 is coaxial with and rotatable on the shaft 38 and rod 41 is attached to sleeve 164. The knob 163 is used to regulate the charge of the spring 161 on sleeve 164 by rotating the adjustable end of spring 161 with respect to the shaft 38 so as to provide its windings with a varying amount of torsion. In order to lock the knob 163 in numerous adjustment positions, locking means 166 have been provided, comprising for example a small ball housed in the knob 163 and pushed by a spring to couple with recesses located in the outer surface of the shaft 38 along its circumference.

Whereas the shaft 38 is held motionless in the measuring position defined by the alignment between disk 42 and position sensor 44, the rod 41, being connected by elastic means to shaft 38 through spring 161, can oscillate during variations of the tension of the yarn 31. To limit these oscillations and to transmit to shaft 38 a torque that is as indicative as possible of tension of the yarn 31, the sleeve 164 is slidingly mounted on shaft 38 by means of a unidirectional coupling 167 and a viscous joint 168. The unidirectional coupling 167 is disposed between the sleeve 164 and the viscous joint 168 and renders the rod 41 and the sleeve 164 integral with the viscous joint 168 only when the rod rotates in the direction opposite that of the arrow 162, under the action of the force F dependent on the yarn tension.

The viscous joint 168 connects the unidirectional coupling 167 with the shaft 38 and includes a rotating flange 169 which is closed inside a case 171, and coupled with internal surfaces thereof through a viscous fluid. The viscous fluid fills the spaces between the rotating flange 169 and the case 171, and gaskets 172 prevent the viscous fluid from seeping out of the case 171. The case 171 is fixed to shaft 38 and is therefore subjected to the same torque that the flange 169, while rotating in viscous manner with respect to the case 171, exerts on it. This torque is, in turn, determined by the force F of the yarn 31 on the rod 41 and therefore also by the yarn tension T. By damping the rotations of rod 41, the viscous joint 168 ensures that the latter rotates at a substantially constant speed during variations of the tension of the yarn 31 and thus permits a yarn tension measurement to be obtained that is minimally effectively disturbance due to the inertia of rod 41. Furthermore, the unidirectional coupling 167 leaves the sleeve 164 free to rotate with respect to the viscous joint 168 according to the direction of the arrow 162, namely when the charge exerted by the spring 161 prevails over force F of the yarn tension on rod 41, and rod 41 thus rotates to retract and put in tension the slackened yarn. Accordingly, when rod 41 has to act as a yarn retractor, it turns extremely rapidly and in a way similar to that of known retractors having rods that act solely to retract the yarn.

As rod 41 can rotate with respect to shaft 38, the force F acting thereon will vary not only as a function of the tension T of the yarn 31, but also as a function of the yarn deviation angle α or, by the same token, as a function of the angle θ (FIG. 15) which defines angular position of the rod 41. For obtaining an exact measurement of the tension that takes into consideration the angular position of rod 41, a sensor of angular positions 173 is provided which transmits a signal POS to both the measuring circuit 54 and the microcontroller 141 which is indicative of the various positions of rod 41, in order to condition measurement of the tension of the yarn 31. The position sensor 173 may comprise an optical group 174 attached to the fixed structure 34, and a blade integral with sleeve 164 in which a plurality of notches 177 are provided which correspond to different positions of the rod and create optical interference on group 174 to generate the POS signal.

As an alternative to using elastic means 161 to make rod 41 as a yarn retractor, it is possible to use the measured value of tension T of the yarn 31 to drive the motor 37, so that the motor 37 acts positively on the yarn 31 by means of rod 41, and exerts a force of preestablished value on the yarn to retract and tension the yarn 31.

Figure 16:
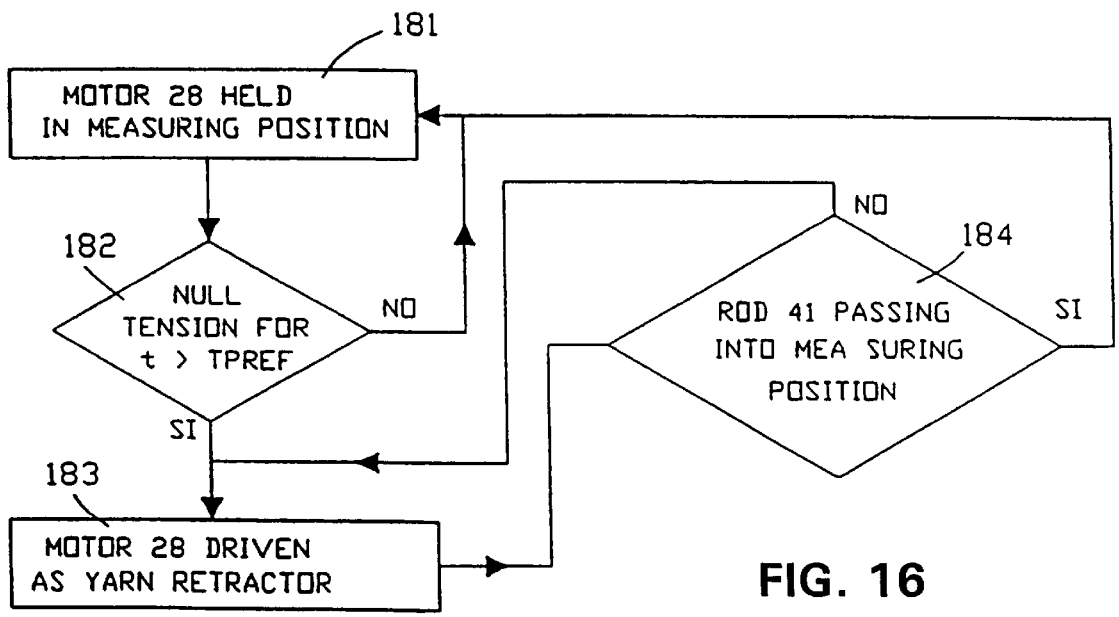
FIG. 16 is a flow diagram of one mode of operation of the device of FIG. 1, to retract yarn.

FIG. 16 illustrates the operation of the motor 37 as a yarn retractor. A program which produces this form of operation may be stored in the memory 143 of microcontroller 141. Block 181 indicates the nominal state of motor 37, in which the rotor 40 thereof is held motionless in the measuring position in order to measure tension of the yarn 31. The decision-making block 182 measures if the yarn tension has been kept null or at least very low for a fixed time TPREF, and if so activates the block 183 in which motor 37 acts as a yarn retractor; if not, on the other hand, it continues to maintain motor 37 in the measuring condition 181. In block 183, motor 37 generates a torque to apply a preestablished force on yarn 31 through rod 41, which consequently rotates and leaves the measuring position. In block 184, the signal S supplied by the position sensor 44 is used to detect whether or not rod 41 passes through the measuring position again. If so, a return is made to block 181 where the motor locks onto and holds the rod motionless in the measuring position so that tension of the yarn 31 can be measured. If not, the status corresponding to block 183 is maintained, whereby motor 37 acts for retracting and tensioning yarn 31.

A typical situation in which tension of the yarn may tend to cancel itself out for a certain time may occur at the end of a cycle of insertion of weft yarn. During such time, motor 37 is therefore made to operate as a yarn retractor, before returning to act as a tension gauge immediately at the start of the subsequent insertion cycle, when rod 41 is abruptly rotated to by the yarn drawing and consequently the rod 41 passes through the measuring position, where it is locked.

The device to control yarn tension can be associated with a yarn feeder 190 (FIGS. 17–20), for example, a weft yarn feeder for a shuttleless loom. The feeder 190 is provided with a drum 191 having an axis 192. A plurality of windings 196 of the yarn 31 are wound around a drum 191 to form a reserve of yarn. The windings are unwound to feed the yarn 31 to a weaving machine (not shown in the drawings) in the direction indicated by the arrow 193. The device to control yarn tension is arranged frontally of the drum 191, where it is borne, at least partially, by a support 194 integral with the fixed structure of the feeder 190. The device also included yarn tension measuring means ("tension gauge") which include electromagnetic control means provided with a movable control element.

In the yarn feeder 190, in order to unwind regularly from the reserve of windings 196 without creating entanglements or slipping of the windings or disorderly movements in general, the yarn 31 needs to a certain extent to be held adherent to the drum 191 while it is drawn off from the reserve and moves radially with respect to the drum 191 towards the axis 192. This can be generally achieved by lightly braking the yarn 31 against the drum 191 along the trajectory of the yarn immediately following the reserve of windings 196. A flexible cap 197 (or similar element) is arranged against a rounded end of the drum 191 in order to brake the yarn 31, which passes between drum 191 and cap 197, while it moves circumferentially along the rounded end as it is drawn off. The cap 197 is adjustable along the axis 192 so as to vary its pressure on drum 191 and hence also braking of the yarn 31.

The device to control tension, may include only the yarn tension gauge, or a combination of the tension gauge with a brake, wherein the gauge and brake cooperate reciprocally to control yarn tension.

In the former case, as the yarn tension measuring means are practically unable to influence the yarn tension but are confined to detecting its value, the cap 197 is the only effective braking element and is therefore used to regulate the operating tension with which the yarn 31 is fed by the feeder to the weaving machine. This means that, in the embodiments of the device without the brake operating together with the yarn tension measuring means, the cap 197 is normally adjusted along axis 192 to exert a more consistent braking on the yarn 31 with respect to the strict minimum amount required to guarantee regular unwinding of the yarn 31 from its reserve.

On the contrary, when the device is equipped with the brake associated with the tension measuring means, the brake is responsible for defining the tension at which the yarn 31 is fed to the weaving machine and, in this case, flexible cap 197 is adjusted to exert on yarn 31 only the minimum braking already stated.

Figure 17:
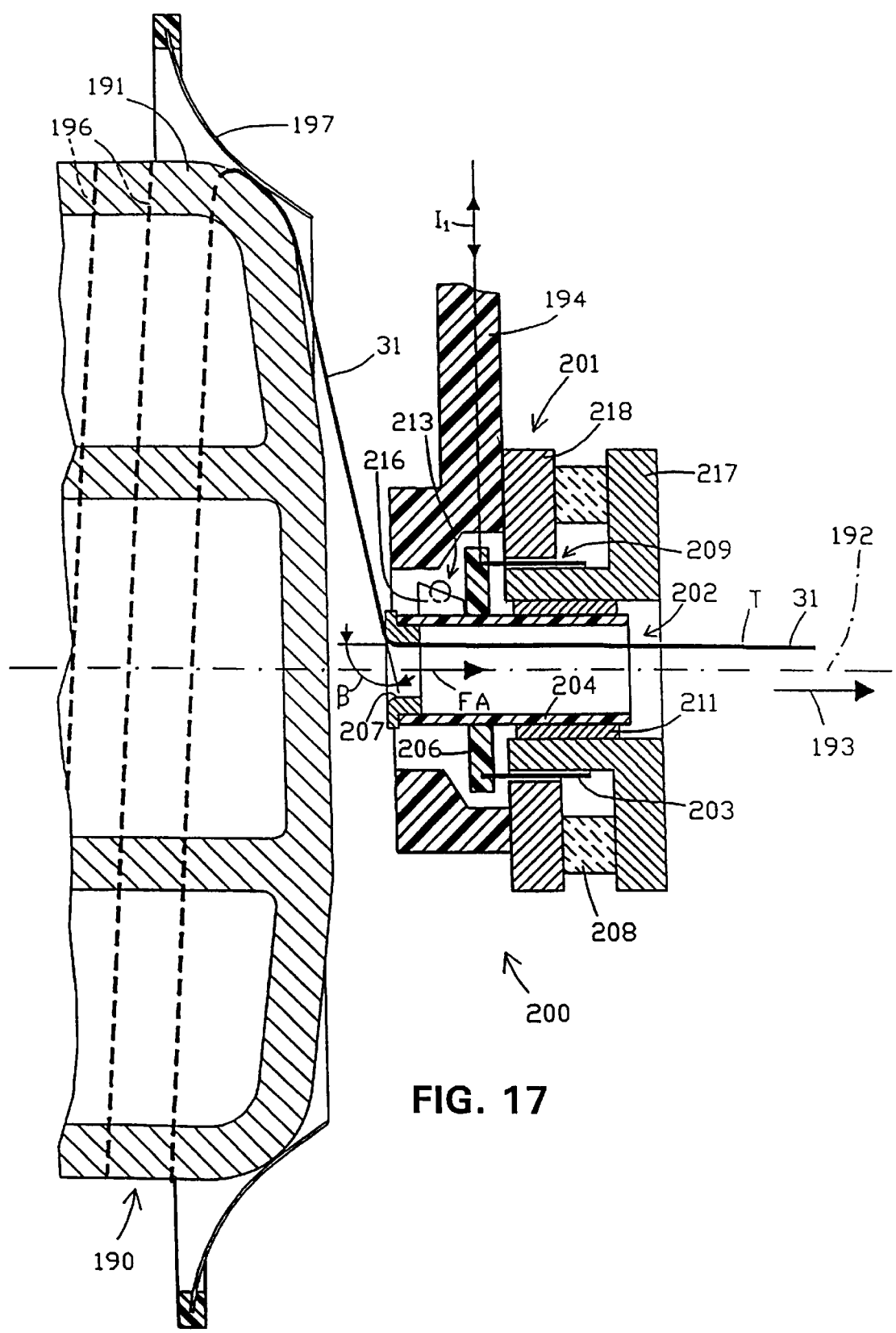
FIG. 17 is a longitudinal section of the device associated with a yarn feeder.

In the device 200 in FIG. 17, the yarn tension gauge 201 is disposed along the axis 192 and is oriented symmetrically around the axis in order to convey the yarn 31 to the weaving machine through an outlet channel 202. In the yarn tension gauge 201, the electromagnetic control means and the movable control element are constituted respectively by a magnetic circuit having a structure similar to that of a permanent-magnet linear motor of the type commonly known as "voice coil" and by a coil 203 coaxial with the axis 192 and partially immersed in the magnetic flux generated by the magnetic circuit. The yarn tension gauge 201 also includes a sleeve 204 which supports the coil 203 by means of a flange 206 and which is arranged coaxially to the axis 192. An eyelet 207 is attached to one end of the sleeve 204 and deflects the yarn 31 towards the axis 192. The eyelet receives yarn 31 radially while the latter bends around the eyelet, coming from the cap 197 (FIGS. 17–20).

The magnetic circuit generates a magnetic field by means of a magnet 208, and defines a ring-shaped air gap 209 which is traversed by the magnetic field. A central part of the coil 203 extends along the gap 209. The sleeve 204 may be linked to the fixed part 194, on condition however that it maintains the capacity to move along the axis 192 in such a way that both the eyelet 207 and the coil 203 move along the axis. For example, the sleeve 204 may be housed slidingly in a support 211 consisting in a ball bearing for axial sliding with low friction. In turn, eyelet 207 is subjected to an axial force the value of which depends on both the tension T in the yarn 31 and also on the angle of deviation of the yarn 31 in relation to the eyelet 207.

Figure 25:
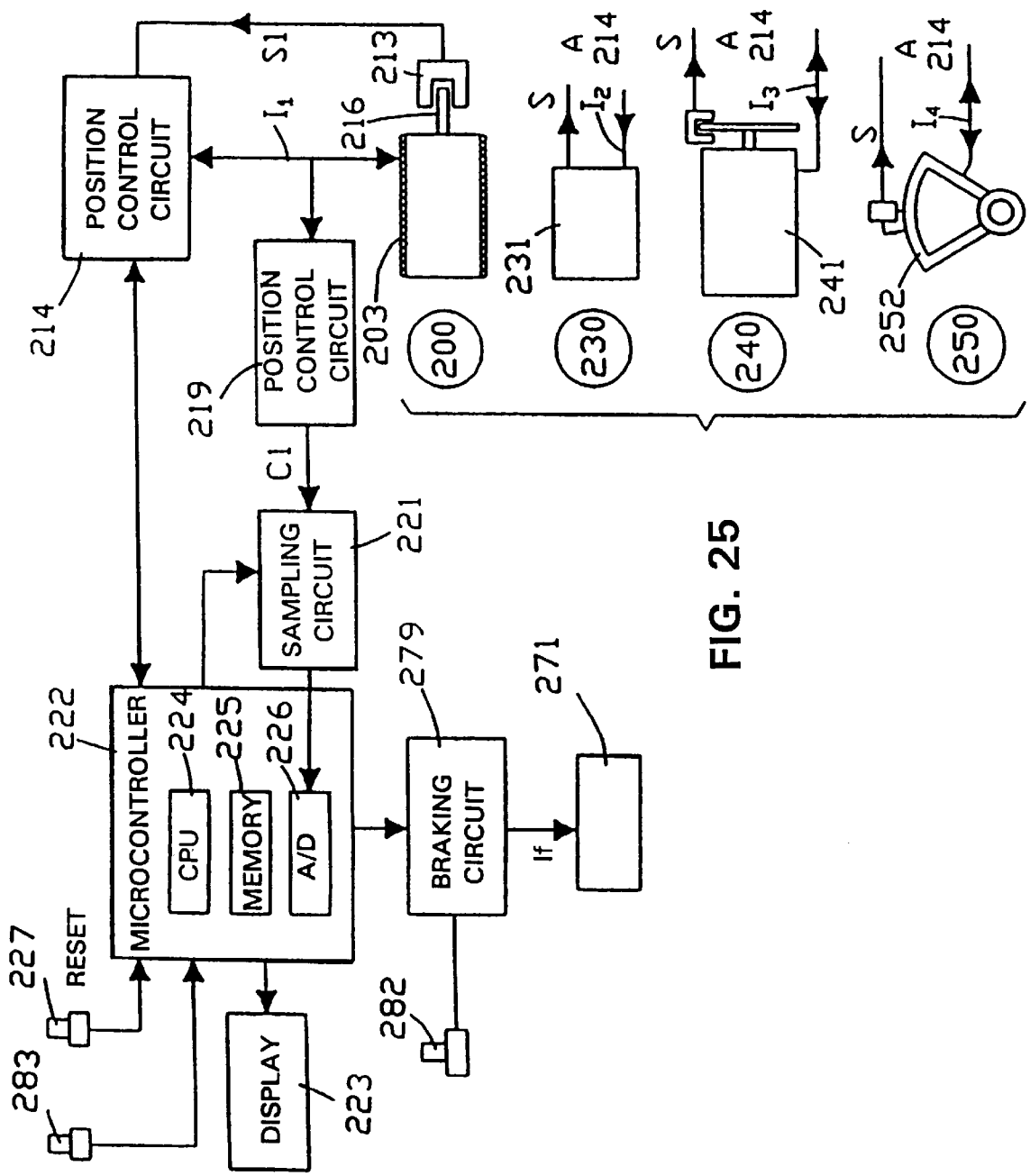
FIG. 25 is an electrical block diagram of the devices and variants of FIGS. 17–20 and FIGS. 23–24.

Taking β (FIG. 17) to indicate the supplementary angle of the yarn deviation angle (the exact angle of deviation is in fact equal to (180°-β)), the axial force FA may be calculated using the formula: FA=2T (cos(β/2))2. As an alternative to fitting slidingly on support 211, sleeve 204 may be linked elastically to the fixed part 194 by diaphragms 212 (FIG. 23) which are elastic in the direction of the axis 192 and rigid perpendicularly to the axis, or equivalent elastic elements, that guide the tube 204 and permit it to move along the axis 192 only. Position sensor 213 emits a signal S1 to a position control circuit 214 (FIG. 25) as a function of axial displacements of coil 203 with respect to a given measuring position along the axis 192 and corresponding to identical axial displacements of the eyelet 207 caused by the axial force FA. In turn, the control circuit 214 supplies coil 203 with a current I1, depending on the signal S1 received from sensor 213. Position sensor 213 may comprise an optical group constituted by an emitter and a receiver cooperating with a blade 216 integral with eyelet 207 and coil 203, wherein the blade 216 intercepts radiation emitted by the emitter in the direction of the receiver in order to generate position signal S1. The magnetic circuit includes two cores 217 and 218 of ferromagnetic material having an axially symmetrical shape with respect to axis 192 and arranged on both sides of the permanent magnet 208, in order to convey the magnetic field produced by the latter across the air gap 209, wherein the magnetic field is apt to generates a magnetic driving force on coil 203 in the direction of the axis 192 when said coil 203 is supplied with the current I1.

In operation of device 200, any axial displacement of coil 203 with respect to its measuring position or, similarly, of eyelet 207 with respect to a rest position thereof corresponding to the measuring position, is signalled by sensor 213 to control circuit 214. In turn, the latter to operates operate on the basis of the signals received from sensor 213 to prevent coil 203 from moving significantly far away from its measuring position. For this purpose, control circuit 214 sends into coil 203 the current I1 with a value such as to generate a magnetic driving force which acts on the coil 203 and balances, in the area of eyelet 207, the axial force FA caused by the yarn.

Accordingly, coil 203 is held virtually immobile in the measuring position, rendering practically insignificant all exchanges of kinetic and elastic energy between yarn 31 and eyelet 207 during variations of the force FA and the corresponding variations of the yarn 31 tension. Current I1 thus adapts instantaneously to the value of the force FA and consequently is indicative of the tension T in the yarn 31.

Moreover, the angle β associated with the yarn deviation at eyelet 207, being close to 90 degrees, defines a force FA (according to the formula provided earlier FA=2T(cos(β/2)) 2) which is of the same order of magnitude as the tension T and which, in any case, for equal values of the tension T, is much higher than the corresponding force F of FIG. 1 (in that case, in fact, F=2Tsin(α) with α being fairly low). Consequently, current I1 will also assume a more significant and higher value in order to balance force FA, with respect to the value of the current I associated with the force F, thus greatly improving the precision and reliability of the tension T measurements.

Current I1 supplied to coil 203 is detected by a circuit 219 (FIG. 25) and generates a signal C1 which is sampled by a sampling circuit 221 and then sent to a microcontroller 222. The microcontroller 222 takes the effective value of tension T from the sampled C1 signals and displays this value on a visualizer 223, in the same way as already described in relation to the embodiments of FIG. 2 and FIG. 13.

The microcontroller 222 comprises a computing unit (CPU) 224, a memory 225 which stores a program planned to control the different operations of device 200, and an analogic-digital conversion section 226 (A/D) which receives the sampled values of signal C1. Finally, the microcontroller 222 is connected to a RESET push-button 227, for resetting of the device 200.

Figure 18:
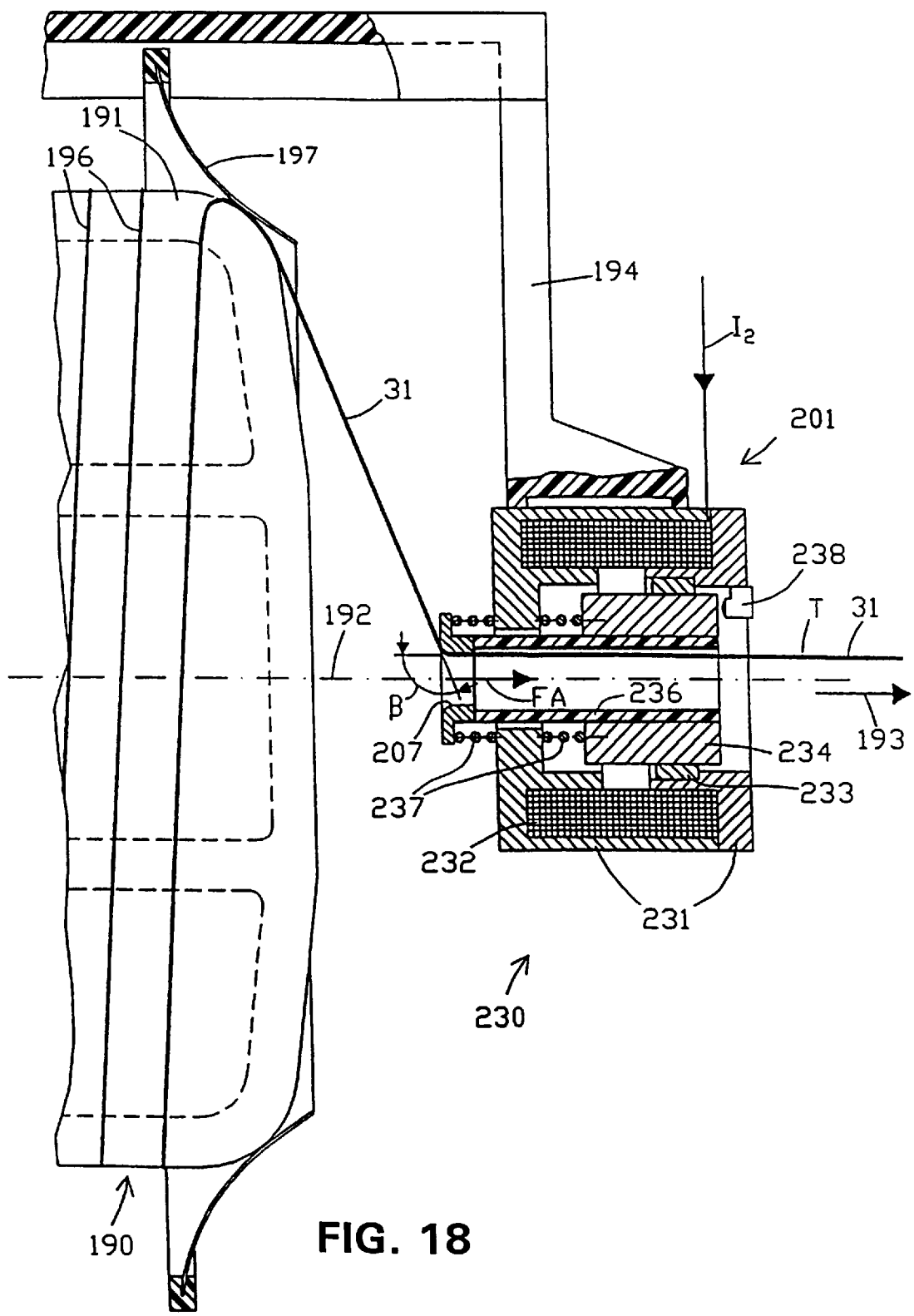
FIG. 18 is a first variant of the device of FIG. 17.

In FIG. 18, device 230 includes electromagnetic control means of the yarn tension measuring means 201 constituted by an electromagnet. The yarn tension measuring means 201 includes a case 231 of metallic material, a winding 232 inside case 231 which is supplied with a current I2, a sliding bush 233, and a cylindrical armature 234 coaxial with the axis 192 and supported slidingly along the axis by bush 233. Armature 234 includes the movable control element. Eyelet 207 is connected to the cylindrical armature 234 by means of a sleeve 236 which transmits to the latter each axial displacement of eyelet 207 caused by variations in tension of the yarn 31. Also provided are elastic means, which are functionally similar to the springs 74 of variant 60 (FIG. 3) described earlier, constituted by two springs 237. The springs 237 are arranged between the case 231 and the group comprising the eyelet 207, the sleeve 236 and the armature 234, and act on this group to hold same elastically in a position of equilibrium along the axis 192, in which position the springs balance each other reciprocally (measuring position). The tension gauge 201 comprises a Hall effect sensor 238 associated with the armature to detect axial displacements thereof, with respect to its measuring position due to variations of the tension T of the yarn 31.

Operation of device 230 with an electromagnet differs from that of the device 200 in that, in order to keep the armature 234 substantially motionless in the measuring position during yarn tension variations, it is not possible to exert opposing magnetic forces on said armature 234. In fact, similarly to device of FIG. 3, the magnetic force generated by the electromagnet and acting on armature 234 assumes a single direction only, irrespective of the direction of the current I2 in winding 232. For this reason, the current I2 is supplied to winding 232 in one direction only, namely that indicated on the right in FIG. 25 with reference to device 230.

Armature 234 is subjected, in a single direction along axis 192, to a magnetic force which opposes force FA and is activated by the current I2 as a function of axial displacements of armature 234 which are directed in accordance with the force FA and, in both directions along the axis 192, to the elastic forces of springs 237. Accordingly, both the magnetic force activated by the current I2 and the elastic forces supplied by springs 237 cooperate to maintain armature 234 in its measuring position and permit current I2 to assume a value indicative of the tension T of yarn 31.

Figure 19:
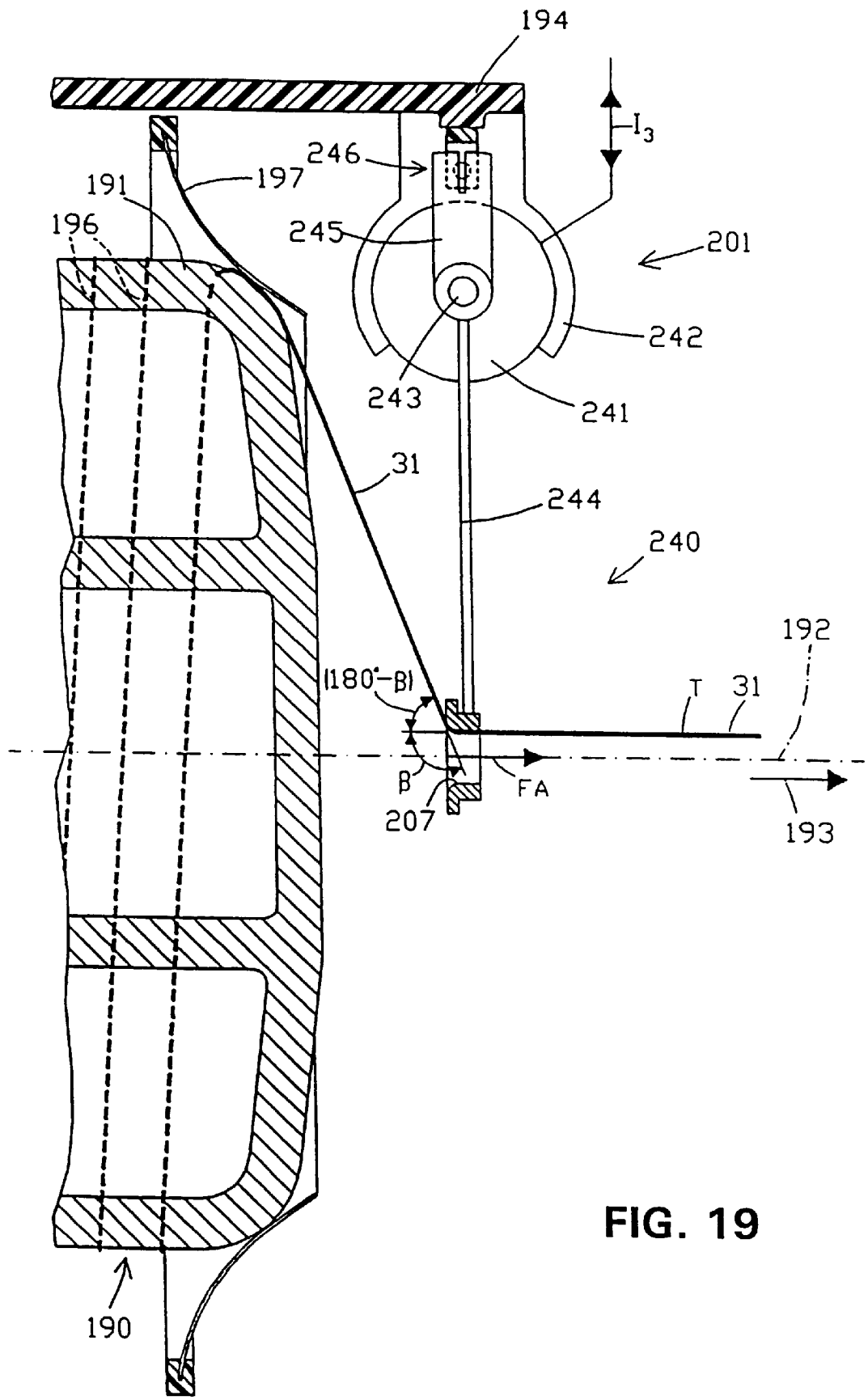
FIG. 19 is a second variant of the device of FIG. 17.

The yarn tension control device 240 in FIG. 19 includes yarn tension measuring means 201, electromagnetic control means and the corresponding movable control element constituted by a motor 241 and by the rotor thereof. The motor is powered by a current I3 supplied by control circuit 214 (FIG. 25) and is attached to structure 194 of the yarn feeder 190 by means of a support 242 in a region disposed laterally with respect to the axis of drum 191. The rotor of the motor 241 is equipped with a shaft 243 to which one end of a rod 244 is attached. The rod in turn supports on its other end the eyelet 207. Shaft 243 is thus subject to a torque, the value of which is equal to the product of the force FA acting in correspondence with the eyelet 207 and depending on the tension T of the yarn 31 by the arm of the force FA with respect to the shaft 243. This arm is determined essentially by the length of rod 244. Also provided is a position sensor 246 which cooperates with a blade 245 integral with shaft 243 and rod 244 to signal each rotation no matter how small, of the rotor of motor 241 with respect to a given measuring position.

In operation, device 240 has the advantage over the previous devices 200 and 230 in that it does not create any encumbrance in the region around eyelet 207, and consequently permits comfort of operation in this region, in manually threading the yarn 31 into the eyelet 207, for example.

FIG. 20 illustrates a device 250, in which the electromagnetic control means and the associated movable control element are constituted respectively by a flat-shaped motor 251 and by a winding thereof 252, also flat in shape. Motor 251 can be classified as a rotary voice coil actuator. Winding 252, which corresponds to the rotary coil, is supplied with a current I4 and is supported by a frame 253 which, in turn, is pivotally mounted on a fixed pin 254 to allow the winding 252 to rotate between two permanent magnets 256 (FIG. 21), keeping at a constant distance from the two. The permanent magnets 256 are supported by a casing 257 which is attached to the fixed structure 194 by means of a support 258 and is constructed of a metal sheet bent into a 'U' shape. The permanent magnets 256 generate a magnetic field suitable to interact with winding 252 supplied with the current I4 so as to generate a magnetic force acting on the latter to rotate it around pin 254. The magnetic force may cause the flat winding 252 to rotate either clockwise or counter-clockwise, depending on the direction of the current I4 in winding 252. Frame 253 is connected to one end of a rod 259, which in turn supports the eyelet 207 at its other end. Finally an optical position sensor 261 is placed between the fixed structure 194 and the frame 253 to signal any displacements of winding 252 from a given measuring position, due to corresponding axial displacements of eyelet 207 caused by variations of the force FA depending on the tension T of the yarn 31.

In FIGS. 20 and 21, the winding 252, the frame 253, the rod 259 and the eyelet 207 form a compact group, comparable to a balancer lever pivotally mounted on pin 254. Consequently, the relationship between displacements of the eyelet 207 and the corresponding displacements of winding 252 is equal to the relationship between the respective radial distances from pin 254. This configuration gives the device optimum size, for achieving the maximum speed of response in measuring yarn tension.

In device 250, an important advantage is that its parts have angular displacements, even if very slight, around the measuring position, unlike other embodiments, such as 200, in which the corresponding parts have rectilinear displacements. The parts of device 250 which pivot on pin 254, are subjected to a very low rotary friction generically dependent on a yarn tension component acting on the eyelet 207. In device 200, the sleeve 204 is constrained to move solely along the axis 192, causing a low friction to act on sleeve 204 due to sliding thereon. In device 250, the position of the fulcrum along the lever, the sections of the arms, the moment of inertia with respect to the fulcrum of the balancer lever, etc. lead to optimum performance. It does not possess parts arranged concentric with and adjacent to eyelet 207, so that the area around eyelet 207 is free. The operation of device 250 is essentially the same as described above. The electrical block diagram of FIG. 25 indicates schematically at the bottom right how the yarn tension control devices 200, 230, 240 and 250 are interfaced electrically with the rest of the diagram. Devices 200, 240 and 250 operate in like manner whereas the device 230 with electromagnet has provision for supply of current I2 in a single direction.

FIG. 22 illustrates mounting of frame 253 on support 258, wherein frame 253 instead of pivoting on the support 258, is connected thereto by means of an elastic plate 262. The plate 262 cooperates elastically with the magnetic forces acting on winding 252 to maintain the latter substantially motionless in its measuring position.

Figure 23:
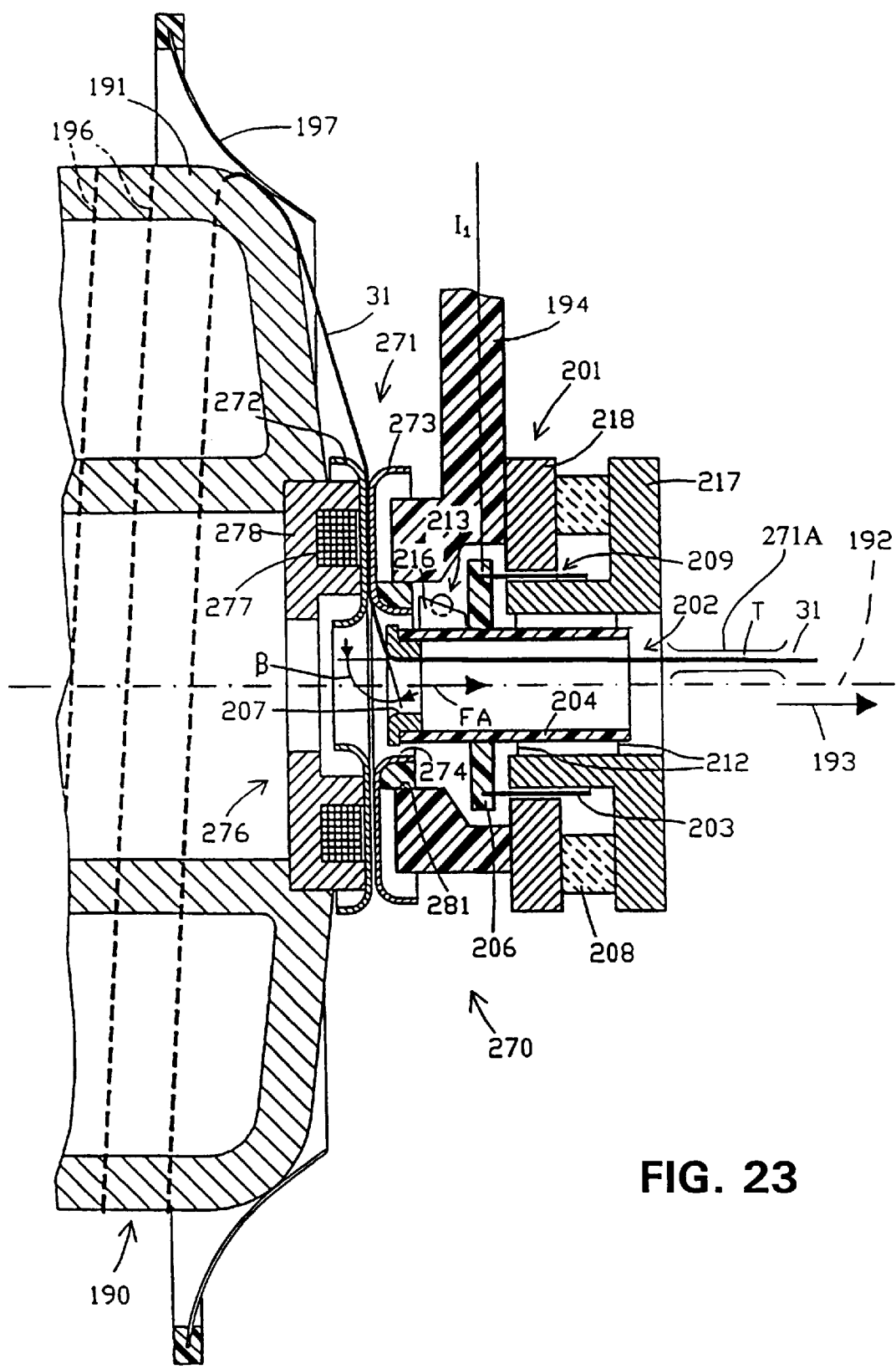
FIG. 23 is a variant of the device of FIG. 17 with the addition of a brake.

Device 270 illustrated in FIG. 23 includes, in addition to tension gauge 201, an electromagnetic type brake 271. Brake 271 cooperates with gauge 201 to brake the yarn 31 as a function of the yarn tension measured by gauge 201. The brake 271 is arranged along the feed path of yarn 31, immediately before the tension gauge 201, which gauge 201 thus receives the yarn 31 directly from the brake 271. Brake 271 includes two disks 272 and 273 which face each other and are coaxial with axis 192 and press yarn 31 between them. Disk 272 is arranged near the drum 191 and disk 273 is disposed near the yarn outlet channel 202. Disk 273 is also equipped with a central hole 274, through which yarn 31 enters the eyelet 207. The latter, in turn, is disposed inside the hole 274, in such a way as to guide yarn 31 during the majority of the deviation of its trajectory towards axis 192. Disk 272 is fixed, whereas disk 273 is movable axially along a guide 281 formed in the support 194, so as to be able to adapt to the cross-sectional size of yarn 31. A magnetic circuit 276, including a coil 277, a core 278, and the disk 273 (constructed of ferromagnetic material) operate to press disk 273 on disk 272 (which is in non-magnetic material) to vary instant by instant braking force on the yarn 31, while it passes between disks 272 and 273.

Brake 271 is controlled by a braking circuit 279 (FIG. 25) and can operate either in a constant braking mode or in a modulated braking mode. Provided for this purpose (FIG. 25) are a regulator 282 of the current If sent to brake 271, for manual regulation of the braking force on yarn 31, and a setting push-button 283 for setting a reference value for yarn tension T, at which modulation of brake 271 must be activated, in a way substantially equivalent to that described in relation to FIGS. 2 and 13.

Figure 24:
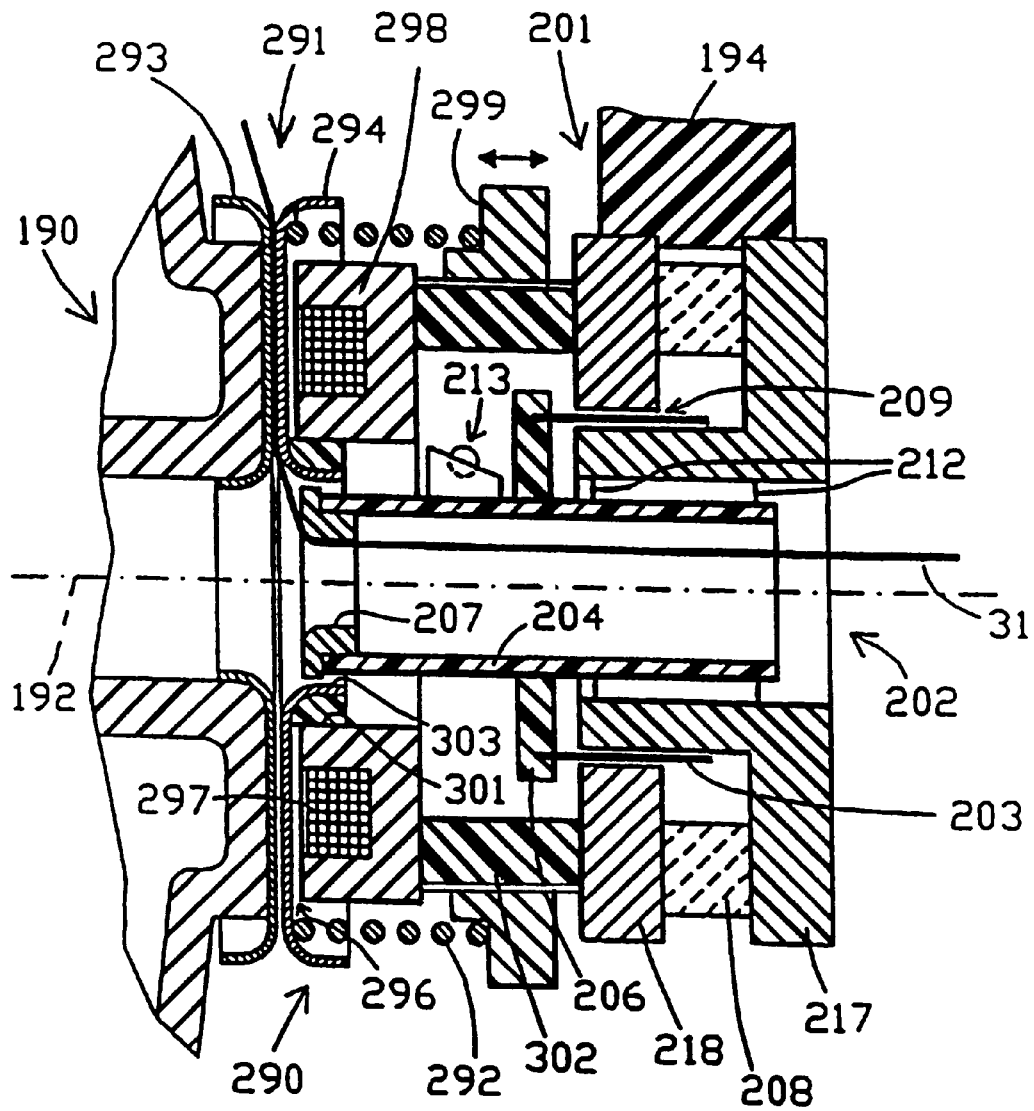
FIG. 24 is a different construction of the variant with brake of FIG. 23.

FIG. 24 illustrates device 290 (similar to device 270), in which brake 271 is replaced by a brake 291, apt to generate a magnetic force which is subtracted from the mechanical force exerted by a spring 292 to vary braking on the yarn 31 when working in modulated braking mode, similarly to the way described in relation to the devices 81 and 101. Brake 291 includes two disks 293 and 294 pushed against each other by spring 292, and a magnetic circuit co-operates with disk 294 by means of an air gap 296 in order to move disks 293 and 294 away from one another. The air gap 296 is traversed by a magnetic field generated by a coil 297 and conveyed towards the air gap 296 by a core 298. The pressure exerted by spring 292 on disks 293 and 294 is manually adjustable by means of a threaded ring-nut 299 which moves along the axis 192, screwing on to a fixed part 302 of the device 290. Disk 294 slides axially on a guide 301 formed in core 298 in order to adapt to the cross-sectional size of yarn 31 and to be able to move away from the fixed disk 293. Disk 294 has a central hole 303, wherein eyelet 207 is housed of the yarn tension gauge 201 (shown in FIGS. 17 and 23).

Brakes 81 and 101, and brakes 271 and 291 have parts arranged between the gap in which the magnetic forces are generated and the surfaces in contact with the yarn, which are characterised by a high mechanical transitivity. These parts are advantageously realised to be very light and to operate rigidly without elastic deformations.

The brakes installed on feeder 190 and responding to the yarn tension measuring means 201 (hereinafter also called yarn tension sensor means 201) are not to be limited to the brakes 271 and 291 described earlier. In another embodiment, the brake associated with the tension measuring means 201 includes an annular cap brake 300 (FIG. 26) of similar shape to the cap 197 described earlier and which is arranged on one rounded edge of drum 191. The annular cap brake 300 may make use of other braking devices superfluous.

Modulation of the braking produced by brake 300 acts on the yarn as soon as it comes out of the reserve of windings 196 on drum 191, and not in the area of eyelet 207, as in the case of brakes 271 and 291. To modulate braking, the annular cap brake 300 is associated with electromechanical actuating means which drive it and alter its pressure on the rounded edge of drum 191, in response to the signals of the yarn tension sensor means 201. The operation and purpose of these electromechanical actuating means for driving the annular cap brake 300 are substantially similar to those of the electromechanical means associated with brakes 271 and 291, i.e. to rapidly vary the braking of yarn 31, even though the electromechanical actuating means for driving the brake 300 are structurally different from the electromechanical means associated with brakes 271 and 291, on account of the different location and the greater braking surface of the annular cap of brake 300.

Figure 26:
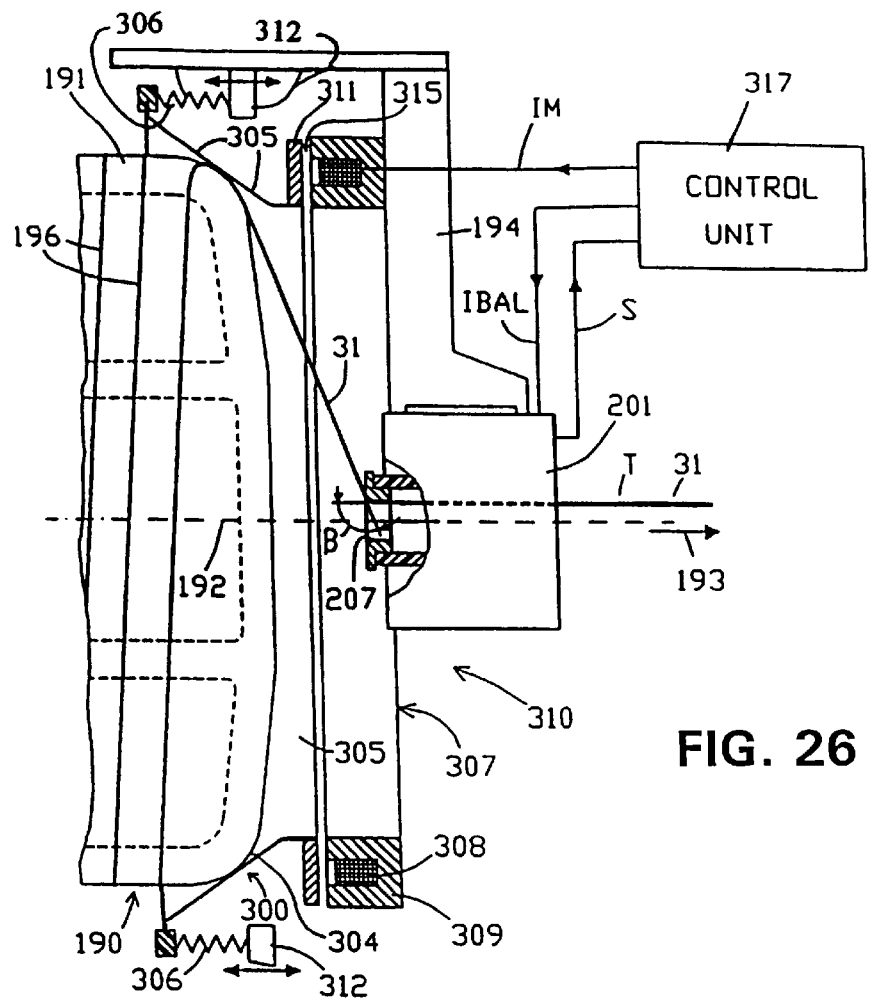
FIG. 26 is a further variant of the device of FIG. 17, with a cap brake.

Device 310 in FIG. 26 is a combination of the yarn tension measuring means 201 with the annular cap brake 300 resting against a rounded edge 304 of one end of drum 191. Cap brake 300 comprises a thin, non-extendible, continuous body 305, that has the shape of a truncated cone and is symmetrical with respect to axis 192. The truncated cone body 305 is intrinsically flexible when free, but can take on a practically non-deformable configuration when pressed against the drum 191 by resilient means 306 which place body 305 under traction. The body 305 is designed to remain substantially non-deformable during variation of the load applied on it by resilient means 306 and/or by the electromechanical actuation means associated with the body 305 itself.

The fact that body 305 fails to bend but locally deforms where the yarn is passing during load variations characterises both the structure and operation of the body 305 with respect to the cap 197 employed in the embodiments described earlier. For a better understanding of the differences between the body 305 and the cap 197, it should be remembered that cap 197 is designed for operation under conditions entirely different from those of body 305 of brake 300. The latter in fact has to be operated in order to modulate braking, whereas cap 197 is arranged so as to exert a constant braking force all during operation. At best, cap 197 may be regulated selectively, prior to operation, in order to vary and set its braking action. Cap 197 is normally constructed in such a way as to bend during regulation along axis 192, so as to vary pressure on drum 191. Note that this flexibility of cap 197 does not have a negative effect on its operation, since cap 197 maintains a substantially stable configuration during operation. Cap 197 may be comprised by a plurality of metallic strips designed to flex and vary their pressure on the drum during manual regulation or, in place of the metallic strips, by brushes that are also pliable.

By virtue of its substantially unbending configuration in the operation, the truncated cone shape body 305 can respond extremely rapidly, by varying its pressure on drum 191, to the commands of the electromechanical actuating means, which consist for example of a ring-shaped magnet 307 fastened to the fixed structure 194 and including coil 308 and a ring-shaped core 309. Provided for performing this high responsiveness is a flange 311 which is fastened to one end of body 305 and which is attracted by magnet 307 to reduce pressure of the truncated cone body 305 on drum 191, that is on yarn 31, in opposition to resilient means 306. Resilient means 306 may be adjusted with respect to frame 194 of yarn feeder 190 by means of a movable support 312, thus varying the pressure exerted on drum 191. It is also possible to regulate an air gap 315 between magnet 307 and flange 311 in order to set the attraction force of magnet 307 on flange 311.

A control unit 317 receives a position signal S from yarn tension measuring means 201, supplies means 201 with a current IBAL to balance the forces acting on eyelet 207 caused by yarn tension T in order to keep the eyelet 207 substantially motionless in a predetermined position and, as a function of the value of the current IBAL, supplies magnet 307 with a current IM to modulate braking on yarn 31.

With the device 310 of FIG. 26, braking force controlled by measuring means 201 is subtracted from a braking force imposed manually by way of resilient means 306. Other schemes may be envisaged, such as the one in which the body 305 is positively pressed against yarn 31 by electromagnetic means controlled by yarn tension measuring means 201 and, for example, housed inside drum 191 in front of body 305.

In other possible combinations of yarn tension measuring means 201 with braking devices, the latter may consist of brakes that produce their braking action essentially by deflecting the trajectory of the yarn. These brakes, also known as multiplying effect brakes, are specially equipped with guides that engage the yarn and cause it to follow a path deflected laterally from the rectilinear path. For yarn braking modulation, these brakes are arranged downstream of means 201 (as indicated at 271A in FIG. 23), along the direction of feed of yarn 31, have movable guides which move with respect to fixed guides, in order to alter lateral deflection of the yarn path and thus the angle at which the yarn is wound on the guides, both movable and fixed.

Figure 27:
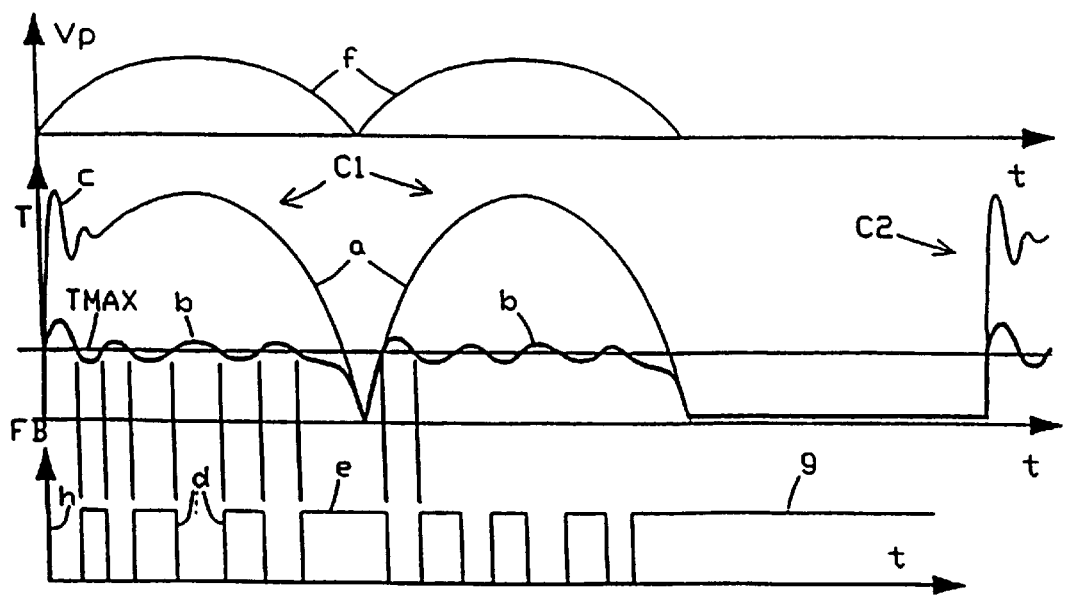
FIG. 27 is a time pattern of parameters applied to control yarn tension during insertion in a loom.

All embodiments described control the tension T of weft yarn during insertion in the shed of a loom. FIG. 27 illustrates the pattern of weft tension (curve a) during insertion in a gripper loom, in conventional type operation without using the device of the invention.

With bold curve b, FIG. 27 shows the pattern obtained when the device of this invention is used. In a conventional type of operation, the cycle of yarn tension T is normally characterised by two distinct parts, which are a true reflection of the speed pattern (curve f) of the two grippers of the loom, the delivering one and the receiving one. The amount of the friction encountered by the weft yarn during insertion in the loom shed, and which is responsible to a large extent for its tension, is in fact in a first approximation proportional to the speed at which the yarn is picked by the two grippers. For this reason, in each part of the cycle there is a maximum tension peak roughly corresponding to the gripper maximum speed condition and, for the same reason, the central part of the cycle normally has a point at which tension tends to be null, corresponding to the changeover of yarn between the two grippers, which takes place at a yarn speed which is practically null. At the start of insertion, there is generally a peak c caused by sharp acceleration of the yarn. FIG. 27 shows that the device serves as a means for avoiding the yarn tension T having a pattern closely linked to speed Vp of the grippers with resultant peaks. The device maintains tension T very close to a predetermined tension pattern, such as defined for example by a constant threshold level TMAX, independently from speed cycle of the grippers. According to curve d of the current absorbed by the brake and corresponding to the braking force FB exerted by the latter on the yarn, the brake intervenes repeatedly in each part of the loom cycle to modulate braking force FB and thus keep tension substantially close to the defined value TMAX, in spite of variations of the yarn speed. The brake intervenes instantly to vary braking force FB each time the threshold TMAX is crossed through by tension T, whether in the ascending or descending direction, respectively to decrease or increase braking force FB.

At the start of the cycle when the weft yarn is accelerated, the brake is deactivated almost immediately (part h of curve d), avoiding an initial tension peak. In the center, when yarn is exchanged between the two grippers, the brake tends to remain active for longer (portion e of curve d), thus allowing yarn 31 to be under tension during the changeover. Further, in the time between one insertion cycle C1 and the next C2, the brake ceases modulation and generates a constant braking force (portion g of curve d). During this time, the yarn is motionless and thus subjected to a static tension of an essentially null or reasonably low value, given that despite the pressing action of the brake on the yarn, the latter does not slide with respect to the brake.

Similar considerations may also be made with reference to other types of looms, such as air jet or projectile looms.

With devices 270, 290 and 310, yarn tension during insertion in the loom shed is controlled without imposing any lateral deviations on the yarn trajectory. The brakes have two faces or guides that press on the yarn from two opposite sides like a clamp in order to guide the yarn and control its tension during insertion, and that also remain substantially motionless during operation, with the result that these guides do not perform transverse movements with respect to the yarn path (fixed guide or clamp brakes).

Brakes referred to earlier altering yarn trajectory laterally by means of movable guides in order to control yarn tension may be used as an alternative to the fixed guide brakes (movable guide or yarn lateral deflection brakes). These are different from fixed guide brakes. These differences might result in inferior performance of the movable guide brakes with respect to the fixed guide brakes in controlling yarn tension during insertion in the loom.

If the yarn lateral deflection or movable guide type brakes are used, for example, with all other conditions being equal, a lower yarn tension control speed is implicitly obtained during insertion, on account of the far from negligible times needed for the movable guides to move from one position to the other in controlling yarn tension. Similar movable guides may consist of retractile guides, each arranged between two fixed guides and controllable in a positive sense to deflect a portion of the yarn sideways with respect to the fixed guides. In this way, it is possible to alter the angle at which the yarn is wound on the guides, whether fixed or retractile, for varying, as a result, the braking exerted by the friction of the guides on the portion of yarn and consequently the yarn tension. Similar movable guides may also consist of guides having a passive operation, such as for example guides that yield under the yarn tension action. In both cases, the rapidity of the device's response in controlling yarn tension is certainly conditioned by the time it takes the movable guides to complete their movements. No such conditioning is imposed by the fixed guide brakes.

The action of movable guide brakes, operating to vary yarn braking by altering the angle at which the yarn is wound on movable and/or fixed guides, is achieved substantially through a multiplying effect on the yarn tension. These movable guide brakes operate substantially as amplifiers of the tension in the yarn at the brake input, so that yarn tension at the brake output depends on the input tension value. If the latter is null, for example, variation of the winding angle described earlier does not produce any yarn tension variation effect. Performance of these brakes may be limited by the fact that a non-null yarn input tension, better still if controlled, is required.

In fixed guide brakes, the fixed guides are suitable for co-operation with the yarn in a relationship of pressure. As being in contact with the yarn and associated with electromagnetic means to vary their pressure on the yarn, these fixed guides can in fact put the yarn in tension without depending on the existence of any yarn input tension, as well as on its value. The fixed guide brakes also have the advantage of not causing any lateral movements of the yarn which could, if rapid, cause corresponding tensions in the yarn because of its lateral inertia. Operation of the clamp brakes that do not laterally alter trajectory of the yarn, is substantially exempt of any dynamic phenomena that could have a negative effect on speed and precision of the yarn tension control. With high and rapidly varying insertion speeds, fixed guide brakes intervene to vary the braking force FB on the yarn during all parts of the insertion cycle, with a promptness and frequency that ensure a practically continuous yarn tension control in time and rapid restoration of the yarn tension programmed pattern after even the slightest deviation of the yarn tension from it.

A surprising effect obtained from the device (particularly, though not exclusively, when equipped with fixed guide brakes) is that yarn tension may be controlled during insertion in a way that is completely independent of the loom cycle, i.e. without synchronising with this cycle and without receiving any commands from the loom cycle control unit, in virtue of the very high speed and precision with which the device intervenes to control tension. Obviously, this does not exclude combinations in which the device of the invention is operable in such a way as to interact with the loom cycle control unit for intervening, for example, at predetermined times during the cycle.

Figure 28:
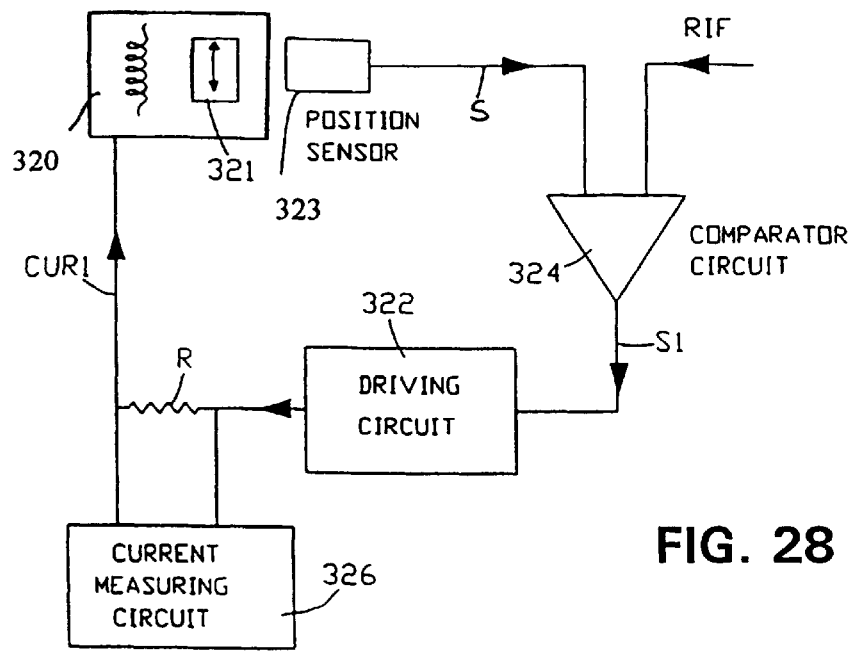
FIG. 28 is an electrical diagram representing some parts of the electrical block diagrams of FIG. 2, FIG. 13 and FIG. 25 in greater detail.

In FIG. 28, balancing current CUR1 supplied to the electromagnetic control means 320 in order to keep the relatively movable control element 321 (corresponding to rotor 40, armature 64, coil 203, winding 252 of the movable coil rotating actuator 251, etc) motionless, is produced by a driving circuit 322 as a function of an analogic offset signal S1. The latter signal can be obtained from comparator circuit 324 by detecting the difference between the analogic signal S issued by position sensor 323 and a constant value reference signal RIF, corresponding to the signal generated by position sensor 323 when movable element 321 is exactly in its predetermined position. Current CUR1 is controlled by circuit 322 in order to prevent any substantial displacement of movable element 321 from its predetermined position and its value is measured by sampling the voltage on the terminals of a resistor R across which current CUR1 flows, using a high impedance measuring circuit 326 so as not to significantly alter the value of CUR1.

Figure 29:
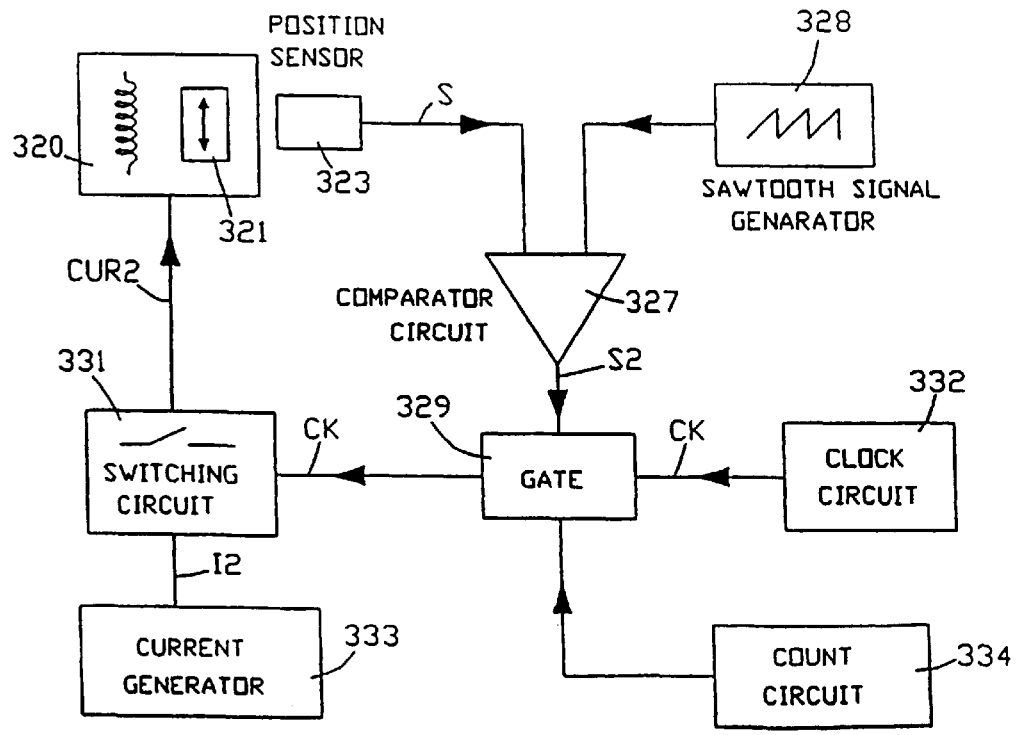
FIG. 29 is a variant of the electric diagram of FIG. 28.

FIG. 29 illustrates a comparator circuit 327 for comparing the signal S coming from position sensor 323 with a sawtooth signal generated by the circuit 328 and outputting a logic signal S2 that is dependent on outcome of the comparison. This logic signal S2 is suitable for controlling a gate 329 placed between a switching circuit 331 and a clock circuit or time base 332 generating a constant frequency signal CK. Accordingly, gate 329 enables or disables passage of signal CK through it and controls activation of switching circuit 331 by signal CK to permit or inhibit a current generator 333 to supply electromagnetic means 320 with a balancing current CUR2. Finally a count circuit 334 determines the percentage of time for which the gate is active and allows passage of signal CK, so that size can be calculated of the balancing current CUR2 supplying electromagnetic means 320 at any time.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A device for controlling tension of a yarn at the outlet of a yarn feeder provided with a drum about which a reserve of yarn windings are disposed for feeding the yarn into a weaving machine, said device comprising:

an eyelet disposed coaxially with an axis defined by the drum for guiding the yarn along the drum axis towards the weaving machine as the yarn is drawn off of the reserve, said eyelet being movable along the drum axis and the yarn extending through the eyelet and exerting a first force thereon which is proportional to the yarn tension and which is oriented along the drum axis; and a yarn tension measuring arrangement including a control circuit, a position sensor, and an electromagnetic control to which current is supplied by said control circuit, said electromagnetic control having a movable control element operable electromagnetically and connected to said eyelet for movement therewith, said position sensor communicating with said control circuit and providing a signal thereto upon displacement of said movable control element from a predetermined measuring position and corresponding to displacement of said eyelet along the drum axis as a result of said first force, said control circuit providing said electromagnetic control with current in response to said signal from said position sensor such that said electromagnetic control generates a second force which moves said movable control element to balance said first force and maintain said movable control element substantially motionless in said predetermined measuring position during variations in the yarn tension, said tension measuring arrangement including means for measuring said current and generating a signal which corresponds to the yarn tension.

2. The device of claim 1 wherein said electromagnetic control includes a magnetic circuit which generates a magnetic field, and said movable control element includes a coil arranged coaxially with the drum and connected to said eyelet for movement therewith, said coil being disposed at least partially in said magnetic field and upon receiving said current from said control circuit, said coil interacts with said magnetic field and generates said second force to maintain said eyelet and said coil substantially motionless during variations in the yarn tension.

3. The device of claim 2 further including a support member which is fixed relative to the drum and an elongate tubular sleeve connected to said eyelet for movement therewith along the drum axis and through which the yarn passes, said sleeve being axially slidingly supported on said support member and mounting thereon a flange which projects radially outwardly therefrom, said coil being connected to said flange adjacent an outer periphery thereof, and said position sensor being mounted generally axially between said eyelet and said flange.

4. The device of claim 1 further including a support member which is fixed relative to the drum and a ball bearing mounted on said support member, said eyelet having a portion which is slidably mounted in said ball bearing to permit axial sliding movement of said eyelet relative to said support member.

5. The device of claim 1 further including a support member which is fixed relative to the drum and at least one elastic support element mounted on said support member and associated with said eyelet to permit axial sliding movement of said eyelet along the drum axis relative to said support member.

6. The device of claim 1 wherein said electromagnetic control includes an electromagnet and a spring device, said movable control element includes an armature connected to said eyelet for movement therewith, said spring device being disposed to exert a control force on said armature which cooperates with said second force and acts in a direction opposite thereto to maintain said armature and said eyelet substantially motionless in said predetermined measuring position during variations in yarn tension.

7. The device of claim 6 further including a support member which is fixed relative to the drum, said electromagnet including a metallic casing mounted on said support member and a winding disposed within said casing, said casing slidingly supporting said armature therein radially inwardly of said winding and including a flange which projects radially inwardly toward the drum axis, said flange having a first side which faces said armature and a second side which faces away from said first side, said spring device including a first spring disposed between said first side of said flange and said armature and a second spring disposed between said second side of said flange and a radially projecting part of said eyelet.

8. The device of claim 7 further including an elongate tubular sleeve connected to said eyelet for movement therewith, said armature having a tubular shape and mounting coaxially therein said sleeve such that said eyelet, said sleeve and said armature move with one another along the drum axis, said armature having a first terminal end adjacent said first spring and a second terminal end axially spaced from said first terminal end, said position sensor being mounted on said casing adjacent said second terminal end of said armature.

9. The device of claim 1 further including a support member which is fixed relative to the drum, said electromagnetic control includes a motor having a fixed housing supported on said support member, a rotor and a shaft projecting from said housing and connected to said rotor for rotation therewith, said movable control element comprising said rotor, said electromagnetic control further including an arm having one end fixed to said shaft and an opposite end fixed to and supporting said eyelet, said first force subjecting said shaft to a torque via said eyelet and said arm, and said current is supplied by said control circuit to said motor such that said motor generates said second force to balance said torque and maintain said rotor substantially motionless in said predetermined measuring position during variations in the yarn tension.

10. The device of claim 9 wherein a blade is fixed to said shaft for movement therewith and said position sensor is supported on said support member adjacent said blade to provide said signal to said control circuit upon movement of said rotor from said predetermined measuring position.

11. The device of claim 1 further including a support member which is fixed relative to the drum, said electromagnetic control includes at least one permanent magnet fixed to said support member, and said movable control element includes a winding and a lever pivotably mounted on a fulcrum fixed to said support member and defining an axis perpendicular to the drum axis, said winding being associated with one end of said lever for movement therewith and being movable parallel to and at a constant distance from said permanent magnet, an opposite end of said lever being fixed to and supporting said eyelet, said lever transmitting to said winding a displacement of said eyelet as a result of said first force, and the relationship between the displacement of said eyelet and the corresponding displacement of said winding relative to said permanent magnet is defined by the relationship between the respective distances of said eyelet and said winding from said fulcrum.

12. The device of claim 11 further including a casing attached to said support member, two of said permanent magnets are supported on said casing in a spaced apart manner from one another and said winding is disposed therebetween for movement parallel to and at a constant distance from each of said permanent magnets.

13. The device of claim 1 further including a brake having at least one movable guide element which contacts the yarn and deflects same transversely with respect to the path of the yarn along the drum axis in response to said signal to modify yarn braking, said brake being arranged downstream of said tension measuring arrangement in the yarn feed direction.

14. The device of claim 1 further including a brake assembly disposed between the drum and said tension measuring arrangement to vary braking of the yarn based upon said signal, said brake assembly including a pair of opposed discs which are arranged coaxially with respect to the drum axis and between which the yarn passes as same unwinds from a terminal end of the drum, and a magnetic circuit which magnetically varies the braking force on the yarn passing between said discs based upon said signal, one of said discs being disposed adjacent said tension measuring arrangement and being ring-shaped so as to define a central hole through which the yarn passes as same approaches said tension measuring arrangement, said eyelet being disposed inside said hole of said one disc to receive the yarn from between said discs.

15. The device of claim 14 further including a core member mounted on the terminal end of the drum and the other said disc is mounted on said core member such that a braking surface thereof is juxtaposed with a braking surface defined on said one disc, said core member including a coil disposed adjacent a side of said other disc opposite said braking surface thereof, and said coil, said core and said one disc forming said magnetic circuit.

16. The device of claim 15 further including a support member which is fixed relative to the drum and an elongate tubular sleeve connected to said eyelet for movement therewith along the drum axis and through which the yarn passes from between said discs, said sleeve being axially slidingly supported on said support member and mounting thereon a flange which projects radially outwardly therefrom, said coil being connected to said flange adjacent an outer periphery thereof, and said position sensor being mounted generally axially between said eyelet and said flange.

17. The device of claim 14 wherein said brake assembly includes a spring disposed to bias said discs toward one another, and said magnetic circuit generates a force which opposes a biasing force of said spring to move the discs away from one another to reduce braking on the yarn, said spring being adjustable so as to selectively vary the biasing force applied to said discs.

18. The device of claim 17 further including a support member which is fixed relative to the drum, the other said disc being mounted on the terminal end of the drum such that a braking surface thereof is juxtaposed with a braking surface defined on said one disc, said spring being disposed between a side of said one disc opposite said braking surface thereof and an axially adjustable nut associated with said support member, said other disc being fixed and said one disc being movable relative thereto, said spring biasing said one disc toward said other disc.

19. The device of claim 1 further including a brake assembly disposed between the drum and said tension measuring arrangement, said brake assembly including a ring-shaped brake arranged coaxially with the drum and biased toward a braking surface defined circumferentially along the drum to brake the yarn as same unwinds from the drum and passes between the brake and the braking surface, said eyelet being disposed to receive and engage the yarn from between said brake and the braking surface, said brake assembly including an electromagnetic control device associated with said brake which is selectively driven by said tension measuring arrangement as a function of said current to actuate said brake and vary braking on the yarn to maintain the yarn tension in conformance with a predetermined pattern.

20. The device of claim 19 wherein the braking surface has a rounded shape and defines a terminal end of the drum from which the yarn is withdrawn, and said brake is a ring-shaped truncated cone which is axially biased against the rounded braking surface.

21. The device of claim 19 wherein said brake assembly includes a resilient member which biases said brake against the drum, said electromagnetic control device including a magnet disposed to attract said brake in opposition to the biasing force of said resilient member in order to reduce braking on the yarn.

22. The device of claim 19 further including a support member fixed relative to the drum, said magnet is ring-shaped and is connected to said support member so as to substantially surround said eyelet, said magnet including a core having a coil therewithin, and a flange projects radially outwardly from one end of said brake adjacent said magnet and is attracted thereto, said current provided to said electromagnetic control is a first current, and said control circuit provides a second current to said magnet based upon said first current to vary the attraction force between said magnet and said flange to modulate braking of the yarn.

23. The device of claim 1 further including a display device configured to display a value corresponding to instantaneous yarn tension based upon said signal.

24. The device of claim 1 further including a brake assembly disposed adjacent said tension measuring arrangement and a braking circuit which controls said brake for operation in either a constant braking mode or a modulated braking mode based upon said current.

25. A method of measuring the tension of yarn at the outlet of a yarn feeder provided with a drum about which a reserve of yarn windings are disposed for feeding into a weaving machine, said method comprising:

providing an eyelet coaxial with an axis defined by the drum and an electromagnetic control having a movable control element connected to the eyelet for movement therewith;

drawing the yarn from the drum and through the eyelet and guiding the yarn along the drum axis towards the weaving machine whereby the yarn exerts a first force on the eyelet upon passing therethrough which is proportional to the yarn tension;

displacing the eyelet and the movable control element along the drum axis from a predetermined measuring position with said first force;

sensing a displacement of the movable control element from said predetermined measuring position and signalling a control circuit;

supplying the electromagnetic control with current from the control circuit and generating a second force to move the movable control element in opposition to each displacement thereof from said predetermined measuring position as a result of said first force to maintain the movable control element substantially motionless in said predetermined measuring position during variations in yarn tension; and detecting the value of said current and generating a signal which corresponds to the yarn tension.

26. The method of claim 25 including providing a brake and controlling the brake so as to continuously adapt braking of the yarn during a cycle of insertion of the yarn into the weaving machine to avoid peaks in yarn tension and to maintain conformance of the yarn tension with a predetermined yarn tension pattern.

27. The method of claim 26 including driving the brake synchronously with respect to the insertion cycle such that braking of the yarn is effected exclusively as a function of the yarn tension based upon said current.

28. The method of claim 26 including providing a microcontroller which stores a predetermined yarn tension value and receives a braking signal based upon said current and corresponding to instantaneous yarn tension, operating the brake in either a first mode wherein the brake exerts a constant braking force on the yarn or a second mode wherein the brake exerts a variable braking force on the yarn, and when the brake is operated in said second mode: increasing the braking force of the brake when the signal corresponding to yarn tension is lower than the predetermined yarn tension value; or decreasing the braking force of the brake when the signal corresponding to yarn tension is greater than the predetermined yarn tension value.

* * * * *

UNITED STATES PATENT AND TRADEMARK OFFICE
CERTIFICATE OF CORRECTION

PATENT NO. : 6,095,449
DATED : August 1, 2000
INVENTOR(S) : Mario Gallo et al.

It is certified that error appears in the above-identified patent and that said Letters Patent is hereby corrected as shown below:

Title page,
Change "[30], Foreign Application Priority Data Sep. 20, 1995 [IT] Italy ................ VC95A0006" to --- " [30] Foreign Application Priority Data Sep. 20, 1995 [IT] Italy ............ VC95A000006 ---.

Signed and Sealed this

Eighteenth Day of September, 2001

Attest:

NICHOLAS P. GODICI
*Attesting Officer*    *Acting Director of the United States Patent and Trademark Office*